(12) United States Patent  
Fava

(10) Patent No.: US 11,839,221 B2  
(45) Date of Patent: Dec. 12, 2023

(54) AUTOMATED LOADING STATION SUITABLE FOR MEAT PORTIONS AND PLANT FOR PROCESSING SAID MEAT PORTIONS

(71) Applicant: FAVA S.N.C. DI ADELE TURETTA & C., Parma (IT)

(72) Inventor: Antonio Fava, Parma (IT)

(73) Assignee: FAVA S.N.C. DI ADELE TURETTA & C., Parma (IT)

( * ) Notice: Subject to any disclaimer, the term of this patent is extended or adjusted under 35 U.S.C. 154(b) by 184 days.

(21) Appl. No.: 17/433,380

(22) PCT Filed: Feb. 18, 2020

(86) PCT No.: PCT/IB2020/051327  
§ 371 (c)(1),  
(2) Date: Aug. 24, 2021

(87) PCT Pub. No.: WO2020/174317  
PCT Pub. Date: Sep. 3, 2020

(65) Prior Publication Data  
US 2022/0183306 A1    Jun. 16, 2022

(30) Foreign Application Priority Data  
Feb. 27, 2019   (IT) .................. 102019000002807

(51) Int. Cl.  
A22C 15/00    (2006.01)

(52) U.S. Cl.  
CPC .......... A22C 15/001 (2013.01); A22C 15/005 (2013.01)

(58) Field of Classification Search  
CPC ...... A22C 15/001; A22C 15/005; A22C 17/02  
USPC ........................................................ 452/187  
See application file for complete search history.

(56) References Cited

U.S. PATENT DOCUMENTS 5,334,088 A  *  8/1994  Le-Normand ....... A22C 15/005  
                                                       452/193  
9,901,103 B1 *  2/2018  Soncini ............. A22C 17/0093

FOREIGN PATENT DOCUMENTS

GB         2281547 A       3/1995

* cited by examiner

Primary Examiner — Richard T Price, Jr.  
(74) Attorney, Agent, or Firm — Browdy and Neimark, PLLC

(57) ABSTRACT

An automated loading station for meat portions configured so as to hook, at a hooking area, a meat portion to a sustaining element, which loading station is provided with a movement apparatus for moving the sustaining elements configured so as to move a sustaining element at the hooking area, a conveying apparatus for conveying the meat portions configured so as to convey the meat portion at the hooking area and to align a segment of the meat portion to a plurality of needles of the sustaining element, and a press configured so as to press the meat portion against the needles of the sustaining element positioned in the hooking area to penetrate the meat portion with the needles.

19 Claims, 19 Drawing Sheets

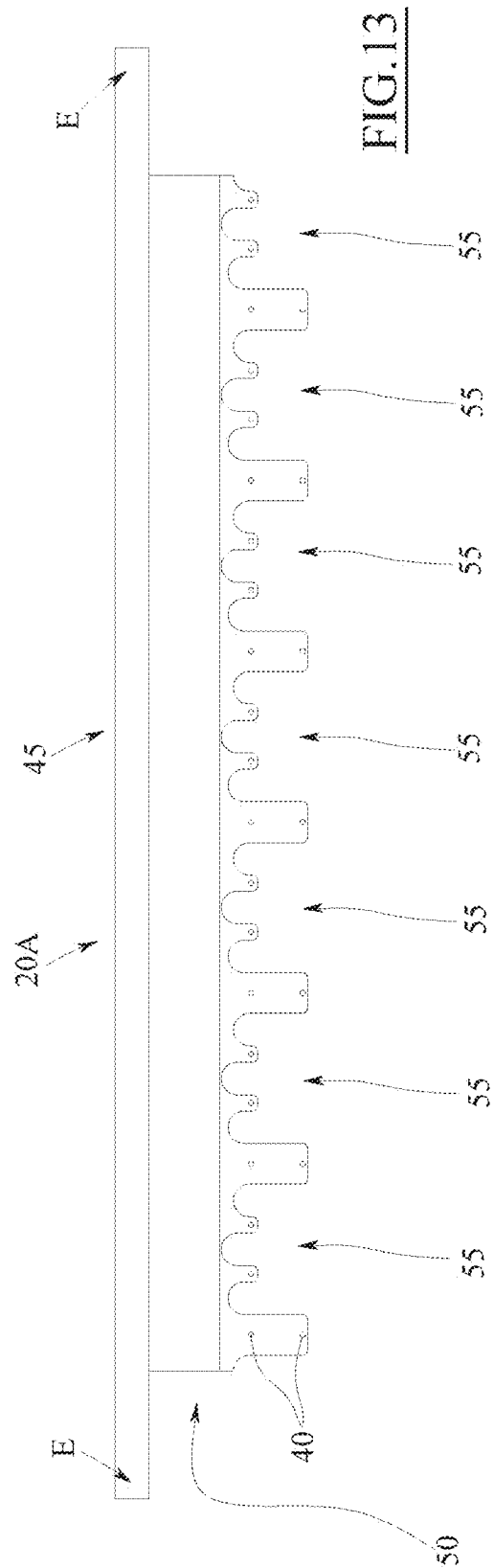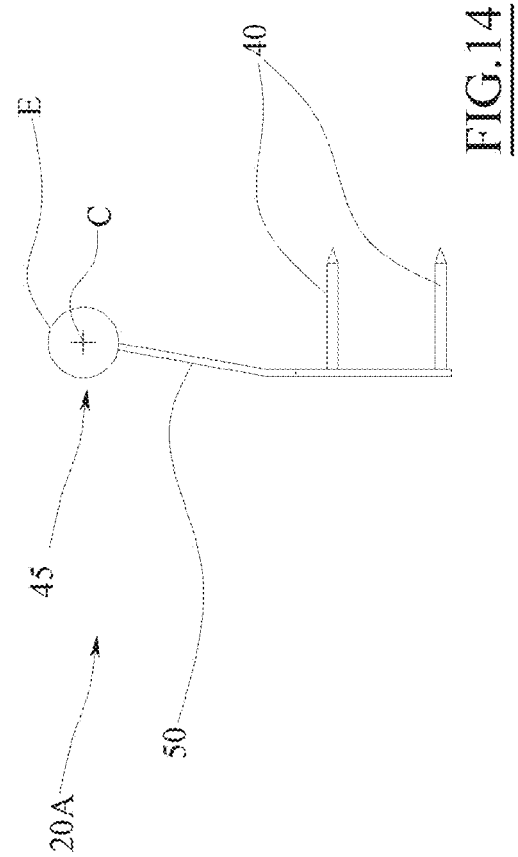

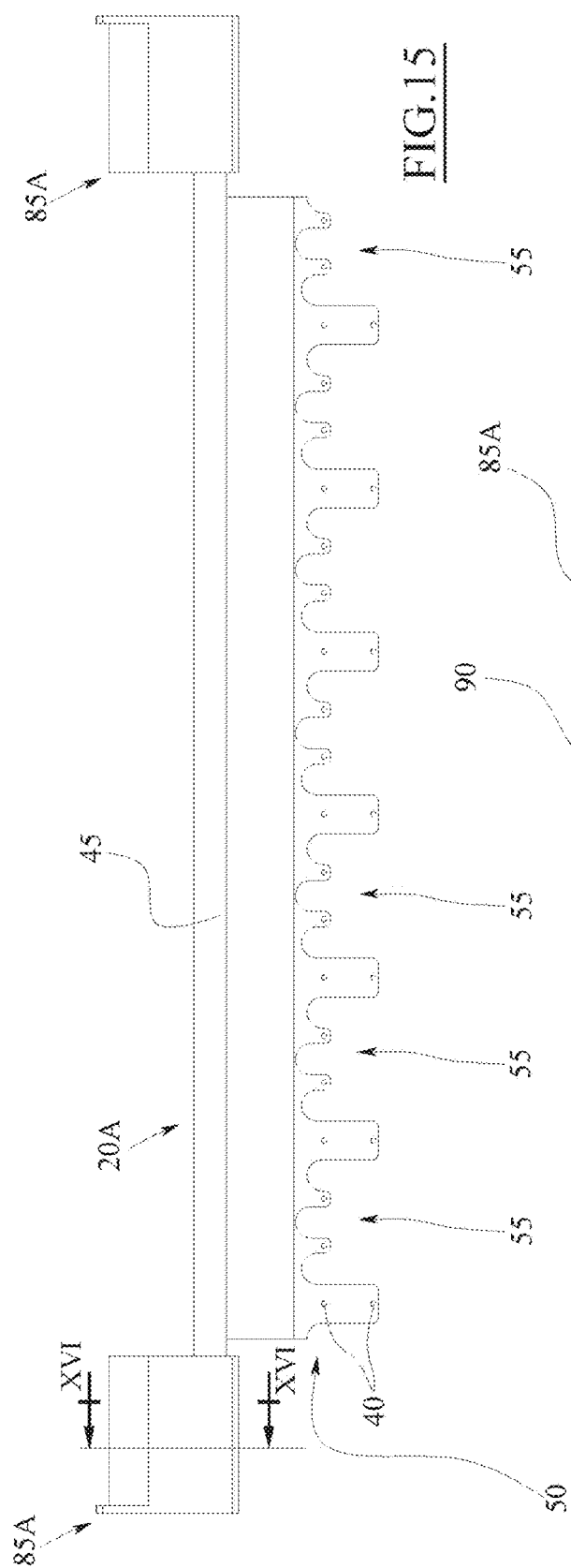
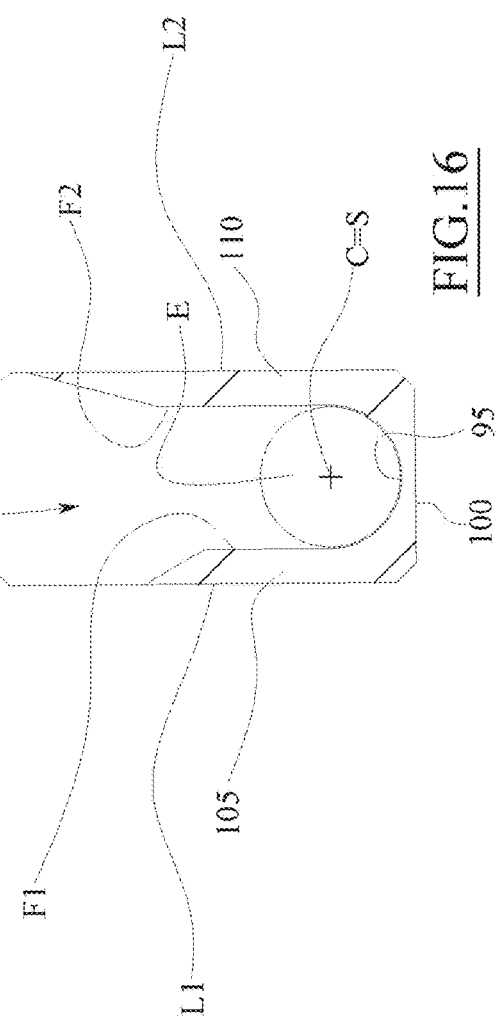

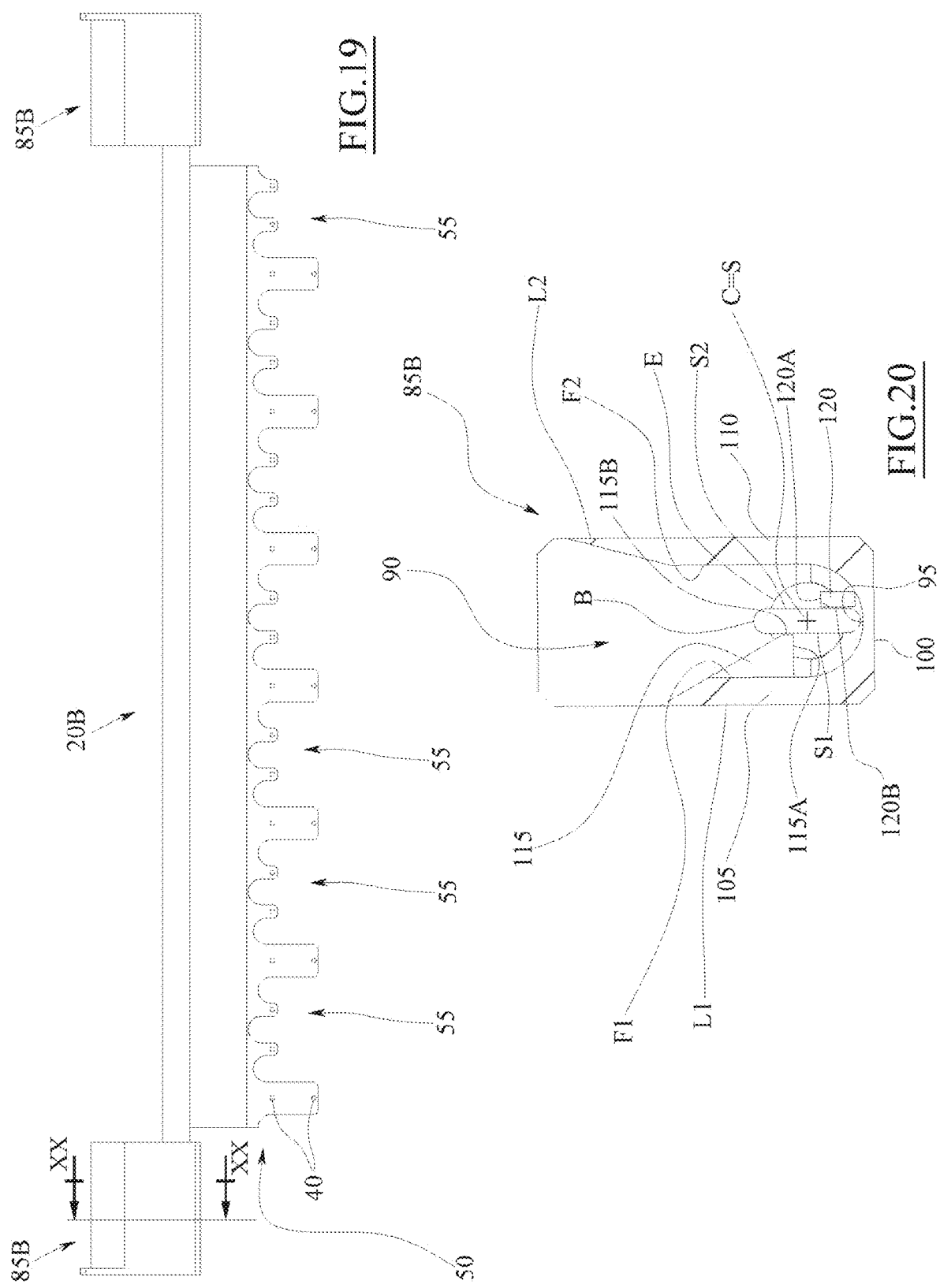

AUTOMATED LOADING STATION SUITABLE FOR MEAT PORTIONS AND PLANT FOR PROCESSING SAID MEAT PORTIONS

TECHNICAL FIELD

The present invention relates to a loading station adapted to hook meat portions, for example meat cuts known as bellies, to sustaining elements, for example hanging bars. The invention further relates to a plant for processing said meat portions, for example a smoking and/or seasoning and/or freezing plant, provided with the loading station and with an unloading station of the meat portions.

EXISTING TECHNIQUE

There are known plants for processing meat portions, for example bellies, or cuts of meat of elongated and irregular shape in which two dimensions (width and height) are prevalent with respect to a third dimension (thickness).

These plants comprise stations for processing meat portions, for example smoking stations, salting stations, seasoning stations, refrigeration/freezing stations, etc. In particular, plants for processing bellies generally comprise at least one smoking station. Known plants can also be provided with automated loading stations, configured to load said loading portions on sustaining elements, or to fix the meat portions to said sustaining elements, which are then exploited to move the meat portions inside the processing stations of the plant.

In practice, the meat portions are moved within the processing stations acting on the sustaining elements to which they are fixed.

In known plants, sustaining elements are used, provided with a bar to which are fixed one or more hooks that project radially therefrom, i.e. radially with respect to a longitudinal axis of the bar.

The bar is used as a hold for the movement of the sustaining element, while the hooks are configured to penetrate the meat portion and to hold it vertically hanging therefrom. A known solution for a loading station adapted to hook the meat portions to sustaining elements so shaped, comprises: a conveying apparatus, for example a conveyor belt, configured to position the meat portions at a hooking area and an apparatus for moving the sustaining elements, which is configured so as to bring a sustaining element at the hooking area and rotate it with respect to an axis of the bar while it translates it upwards, so as to pierce the pieces of meat with the hooks and hence to hook them.

A problem of this solution is that the method necessary to make the hooks penetrate the meat produces cuts in the meat due to the curved shape of the hooks, thus spoiling a segment of the meat portion, i.e. reducing its value. In fact the segment that is damaged by the hooks, subsequently undergoes a processing sequence to be reused in the production of less valuable products.

In addition, this problem is further worsened at the time of unloading in which it is necessary to extract the hooks from the bellies, considering that in these conditions generally the pieces of meat are at low or very low temperatures in order to facilitate subsequent cutting processes.

An object of the present invention is to overcome the constraints of the prior art within a rational, low-cost solution which at the same time also allows to boost the productivity of the plant. Such object is achieved by the features of the invention indicated in the independent claim. The dependent claims outline preferred and/or particularly advantageous aspects of the invention.

DESCRIPTION OF THE INVENTION

In particular, an embodiment of the present invention makes available an automated loading station for meat portions, configured so as to hook, at a hooking area,
  a meat portion and a sustaining element, which loading station is provided with:
  a movement apparatus for moving the sustaining element configured so as to move a sustaining element at the hooking area,
  a conveying apparatus for conveying the meat portions configured so as to convey the meat portion at the hooking area and to align a segment of the meat portion to a plurality of needles of the sustaining element, and
  a press configured so as to press the meat portion against the needles of the sustaining element positioned in the hooking area to penetrate the meat portion with said needles.

With this solution, the meat portions are hooked to the sustaining element with minimal laceration of the meat itself.

In a preferred aspect of the invention, each needle is rectilinear.

In this way, the insertion of the needle in the meat portions is simpler and more straightforward.

According to another aspect of the invention each sustaining element comprises a bar to which are rigidly connected the needles of the plurality of needles.

This solution allows the sustaining element to support simultaneously a plurality of meat portions flanking each other, boosting the productivity of the loading station.

According to another aspect of the invention, the movement apparatus comprises a platform located in the hooking area and able to support the sustaining element inferiorly.

According to another aspect of the invention, the movement apparatus comprises a support element to which the sustaining element is connected removably to move said sustaining element at the hooking area.

According to another aspect of the invention, the support element and the sustaining element are configured so as to allow a relative rotation of the sustaining element with respect to the support element between a first end stop position and a second end stop position, which end stop positions are separated by a rotation between 80° and 100°.

This solution allows to limit the oscillation of the meat portion with respect to the sustaining element.

According to another aspect of the invention, the press comprises a base and contact body able to contact the meat portions directly to penetrate the meat portion with said needles and movable along an axis perpendicular to the platform.

A different embodiment of the invention makes available a plant for processing meat portions provided with a loading station constructed according to the first embodiment and with an unloading station.

An additional embodiment of the invention makes available an unloading station configured so as to unhook a meat portion from a sustaining element and that comprises:
  an abutment body defining an abutment surface able to sustain the meat portion inferiorly,
  a movement apparatus for moving the sustaining elements, configured to move a sustaining element at the abutment body between a first position, in which the sustaining element is at a higher elevation with respect to the abutment surface, and a second position, in which the sustaining element is at a lower elevation with respect to the abutment surface, so that in the passage from the first position to the second position the meat portion rests at least partially on the abutment surface and the needles are extracted from the meat portion.

With this solution, the meat portions are not damaged during the unloading step.

According to a preferred aspect of the invention, the movement apparatus of the unloading station comprises a support element to which the sustaining element is rotatably connected and the movement apparatus is configured to move the support element at the abutment body between the first and the second position. With this solution, a greater flexibility of operation is obtained as a result of the possibility for the support element to oscillate.

According to another aspect of the invention, the movement apparatus of the unloading station comprises a rotation limiter device, which is configured to prevent the relative rotation of the sustaining element with respect to the support element beyond an end stop position in which the needles are oriented upwards and with longitudinal axes perpendicular to an axis of lay of the abutment surface.

With this solution, lacerations of the meat portions during the step of extracting the needles from the meat are avoided.

According to another aspect of the invention, the rotation limiter device is configured to limit the relative rotation of the sustaining element with respect to the support element between a first end stop position in which the needles are arranged with the longitudinal axes horizontal (under the weight of the force of gravity) and a second end stop position, in which the needles are arranged with longitudinal axes perpendicular to an axis of lay of the abutment surface and are oriented upwards (because of the constraint of the belly on the abutment surface).

According to another aspect of the invention, the rotation limiter device comprises an abutment body with which the sustaining element is provided, and a first abutment body and a second abutment body, configured to cooperate with the abutment body, and with which the support element is provided.

According to another aspect of the invention, the movement apparatus comprises a guide configured to prevent a rotation of the support element with respect to the abutment body.

A different embodiment of the invention makes available a plant for the processing of meat portions provided with a loading station according to the first embodiment and with an unloading station like the one described above in the previous embodiment of the invention.

Another embodiment of the invention makes available a sustaining element for a meat portion, able to allow the movement of said meat portion, which sustaining element comprises a plurality of needles, a bar to which are rigidly connected said needles and an abutment body rigidly fixed to an axial end of said bar.

According to an aspect of the present embodiment, the abutment body comprises a first abutment surface and an opposite abutment surface, which are parallel with respect to a longitudinal axis of the bar.

According to an aspect of the present embodiment, the bar has a cylindrical portion at the axial end.

According to the present embodiment, each needle is rectilinear.

BRIEF DESCRIPTION OF THE DRAWINGS

Further features and advantages of the invention will be more apparent after reading the following description provided by way of a non-limiting example, with the aid of the accompanying drawings.

FIG. 13 is a front view of a first embodiment of the sustaining element.

FIG. 14 is a lateral view of a first embodiment of the sustaining element.

FIG. 15 is a front view of the first form of the sustaining element shown in FIGS. 13 and 14, associated with a first embodiment of a pair of support elements according to the invention.

FIG. 16 is a section view according to the plane XVI-XVI of FIG. 15.

FIG. 19 is a front view of the second form of the sustaining element shown in FIGS. 17 and 18, associated with a second embodiment of a pair of support elements according to the invention.

FIG. 20 is a section view according to the plane XX-XX of FIG. 19.

BEST MODE OF THE INVENTION

Figure 2:
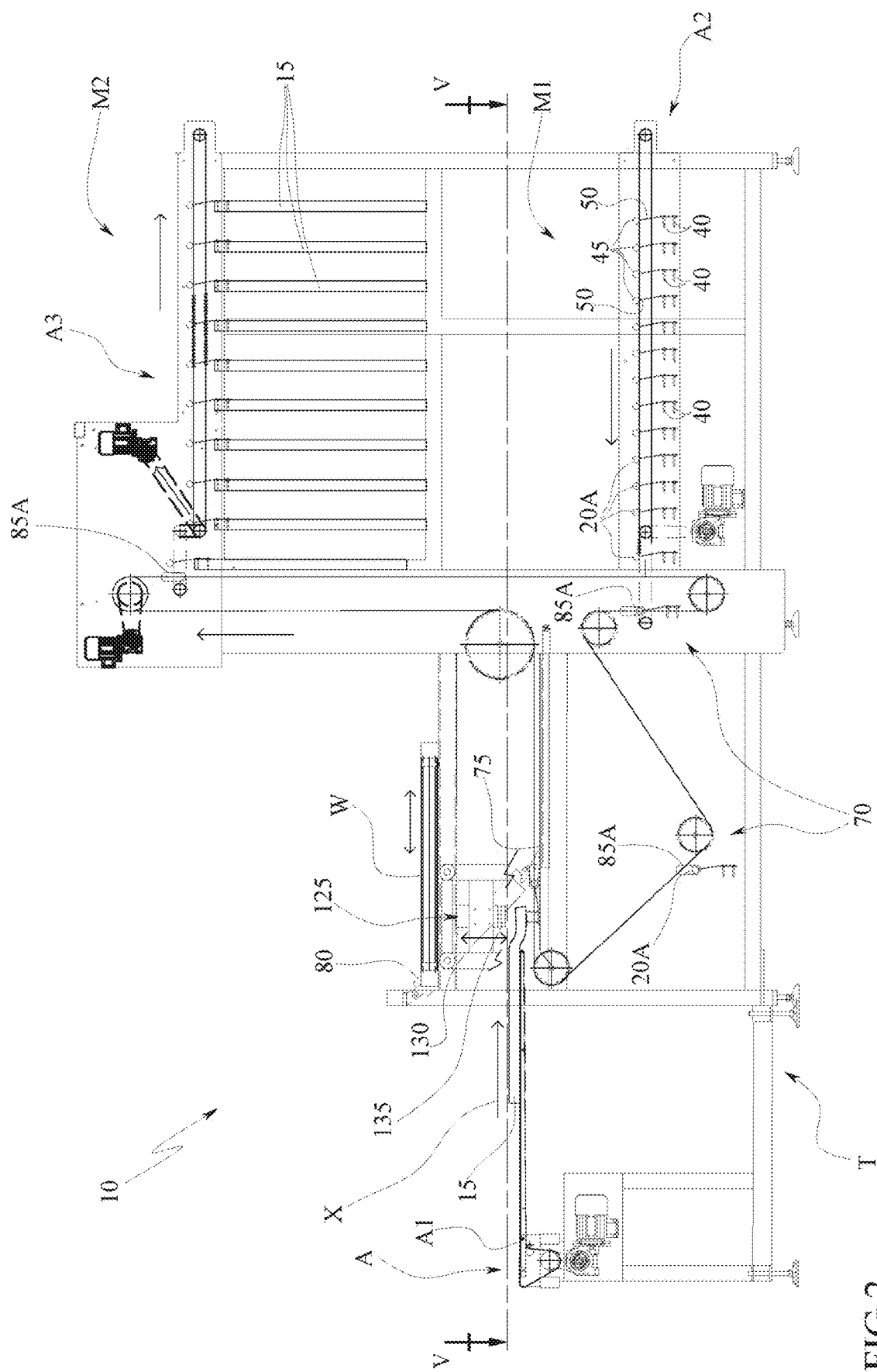
FIG. 2 is a schematic lateral view of a first embodiment of the loading station, shown in an operating step thereof.
Figure 25:
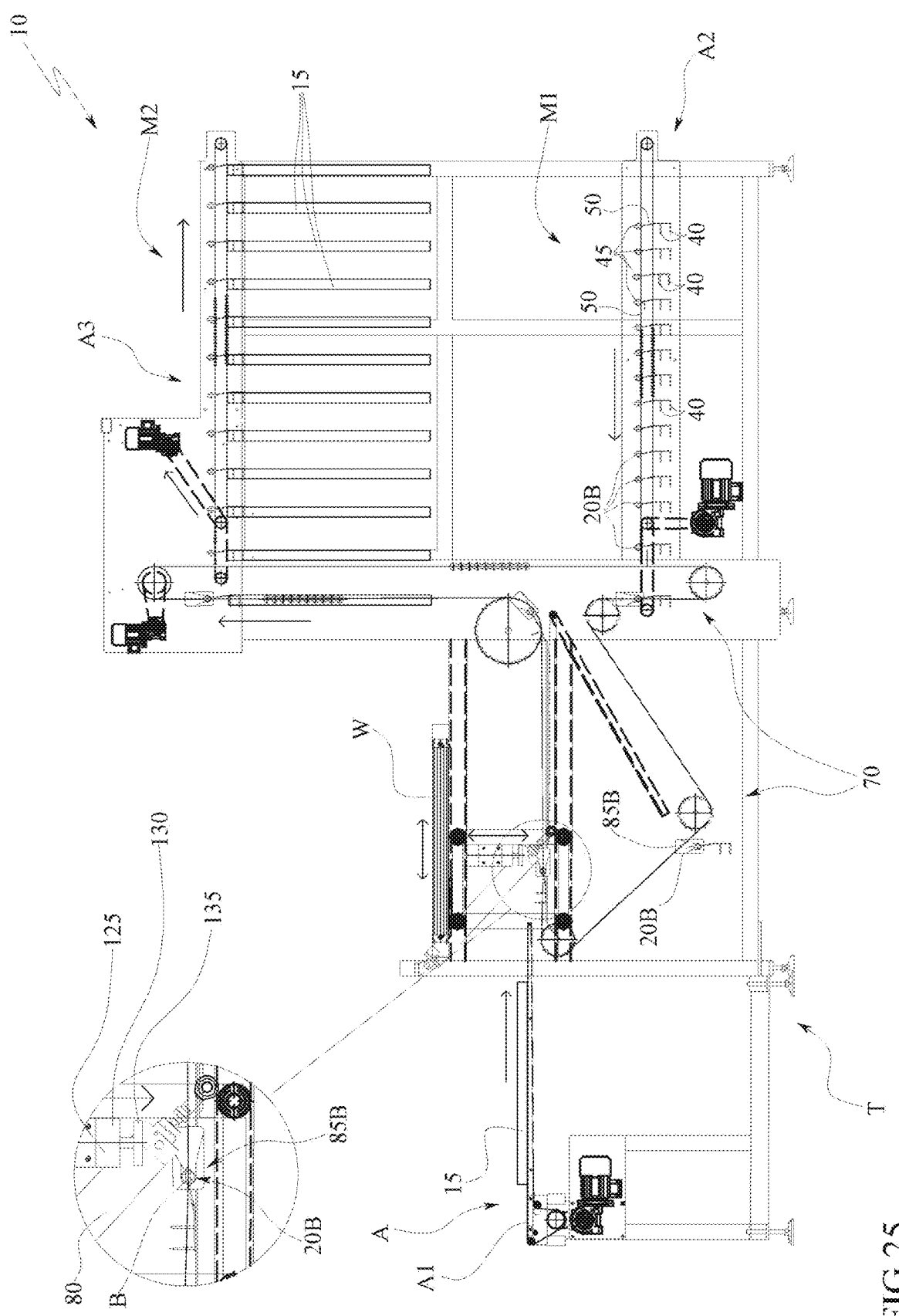
FIG. 25 is a schematic lateral view of the first embodiment of the loading station in which the sustaining elements and the supporting elements according to the second embodiment of both are present, with an enlarged portion in which said sustaining element and said support element are more clearly visible.

With particular reference to these figures, the numeral 10 globally designates an automated loading station, to load, or to hook, meat portions 15, for example bellies, to sustaining elements 20A, 20B (FIGS. 2 and 25).

The sustaining elements 20A, 20B are used to move the meat portions 15 inside a processing plant I for processing the meat portions 15 of which the loading station 10 is a part, or in at least part of said plant.

For example, the processing plant I comprises one or more processing stations positioned downstream of the loading station 10 with respect to the direction of a work flow of the meat portions 15 in the processing plant. In the illustrated embodiment, said processing plant I comprises a cooking/smoking station 30 positioned downstream of the loading station 10 and a freezing or chilling station 35 positioned downstream of the smoking station 30.

The meat portions 15 are moved through the smoking station 30 and freezing or chilling station 35, by means of the sustaining elements 20A,20B.

Each sustaining element 20A,20B comprises a plurality of needles 40 able to penetrate the meat portions 15, so as to fix, i.e. to hook, at least one meat portion 15 to the sustaining element 20A,20B.

The needles 40 of each sustaining element 20A, 20B can be arranged so that a longitudinal axis of each needle 40 is parallel to the longitudinal axes of the other needles 40. In the illustrated embodiment, the needles 40 of each sustaining element 20A,20B are grouped in parallel rows, for example two parallel rows, in which the needles 40 flank each other, at a non-zero distance from each other, along a rectilinear direction of flanking.

The needles 40 can be rectilinear, i.e. they can develop along a rectilinear axis. In the illustrated embodiment, each needle 40 comprises a cylindrical portion terminating with a pointed portion, for example conical.

However, in alternative embodiments, not illustrated herein, the needles 40 may lack the pointed portion or alternatively they may be entirely shaped as rectilinear conical bodies. In an alternative embodiment not illustrated herein, the needles 40 may be slightly curved.

Each sustaining element 20A,20B can comprise a hold body to be directly contacted to allow the movement of the sustaining element 20A,20B. To said hold body are connected, for example rigidly, the needles 40. In particular, the needles 40 are connected to the hold body without any residual degree of freedom.

For example, the hold body comprises a bar 45, preferably rectilinear, to which are connected the needles 40, for example without residual degrees of freedom.

The needles 40 can be arranged so that the directions of flanking of the rows of needles 40 are parallel to a longitudinal axis of said bar 45.

The needles 40 can also be connected to said bar 45 so as to be slanted with respect to the longitudinal axis of the bar 45 and perpendicular to a plane containing said longitudinal axis.

The bar 45 can have a cylindrical portion E, i.e. a portion of cylindrical shape, at an axial end of the bar 45. For example, the bar 45 has two cylindrical portions E each at a respective axial end.

Each sustaining element 20A,20B can comprise a plate 50 (FIGS. 13 and 14), which is rigidly fixed to the bar 45, for example fixed without any residual degree of freedom to the bar 45, and to which the needles 40 are rigidly fixed, for example without any residual degree of freedom. In the illustrated embodiment, the needles 40 are riveted to the plate 50.

Preferably, the plate 50 extends along a radial direction with respect to the longitudinal axis of the bar 45.

The plate 50 can comprise two segments, of which at least one is planar, to which are fixed the needles 40 so that the longitudinal axes of the needles 40 are perpendicular to an axis of lay of said segment.

For example, the needles 40 are fixed to a single face of the segment of the plate 50, i.e. they all project in overhang from a single face of the segment of the plate 50 to which they are fixed.

Preferably, a face of the segment of the plate 50, opposite to the one from which the needles 40 project, is substantially planar.

In the illustrated embodiment, the plate 50 comprises a first segment, for example planar, directly fixed to the bar 45 and a second segment, for example planar, integral with the first segment and to which the needles 40 are rigidly fixed.

The second segment of the plate 50 is preferably inclined with respect to the first segment.

The plate 50, or the second segment of the plate 50, can have an inlet 55, for example a plurality of inlets 55, each of which extends, from an edge of the plate 50 distal from the bar 45, in the direction of approach to said bar 45. The inlet 55 can be obtained in the segment of the plate 50 to which the needles 40 are fixed, for example in the second segment.

Each inlet 55 for example extends along the plate 50 so as to be interposed between at least two needles 40.

Each inlet 55 can have elongated shape and have a longitudinal axis transverse, for example perpendicular, to the longitudinal axis of the bar 45.

The inlets 55 may pass through, for example they completely traverse the plate 50 in the direction of a thickness of the plate 50 itself, i.e. they completely traverse the plate 50 along a direction parallel to the longitudinal axes of the needles 40.

Each sustaining element 20A,20B is so shaped that, or it has a center of gravity such that, when the sustaining element 20A,20B itself is supported inferiorly by means of a contact that acts on the bar 45, i.e. on the cylindrical portions E of the bar 45, and there are no forces acting on the sustaining element 20A,20B it arrives by gravity in an unperturbed position, in which the needles 40 are oriented substantially horizontally.

As shown in the figures, each sustaining element 20A,20B can be configured to hook a plurality of meat portions 15 flanking each other along a longitudinal axis of the bar 45, for example three meat portions 15 flanking each other.

With particular reference to FIGS. 13 and 14, in a first embodiment of the sustaining element 20A the bar 45 comprises cylindrically shaped axial ends. In particular, said axial ends have a cylindrical surface without interruptions, i.e. free of protuberances or recesses.

Figure 17:
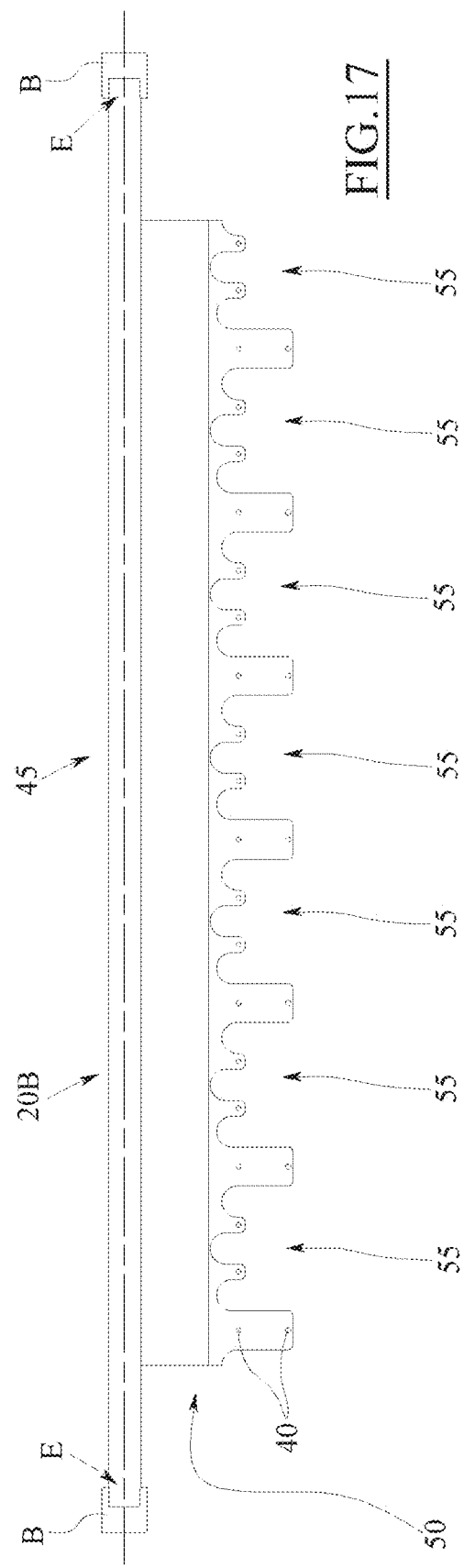
FIG. 17 is a front view of a second embodiment of the sustaining element.
Figure 18:
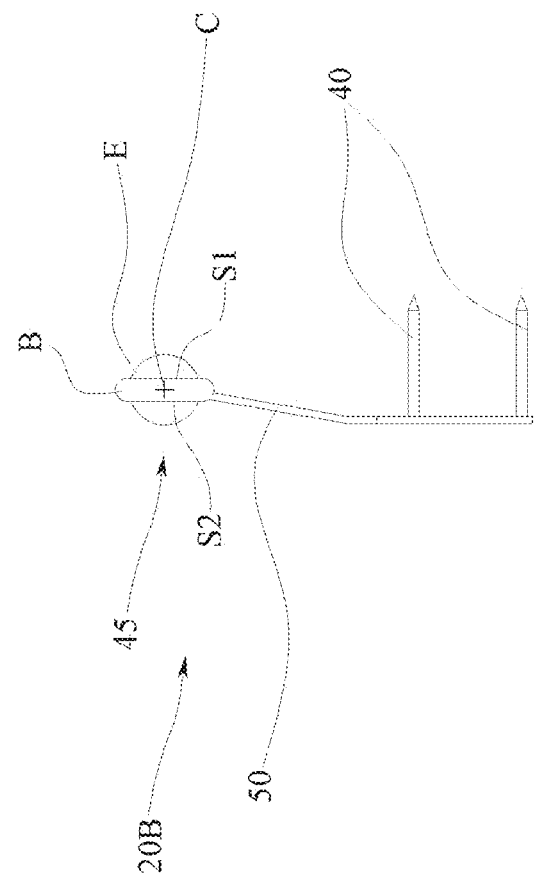
FIG. 18 is a lateral view of a second embodiment of the sustaining element.
Figure 22:
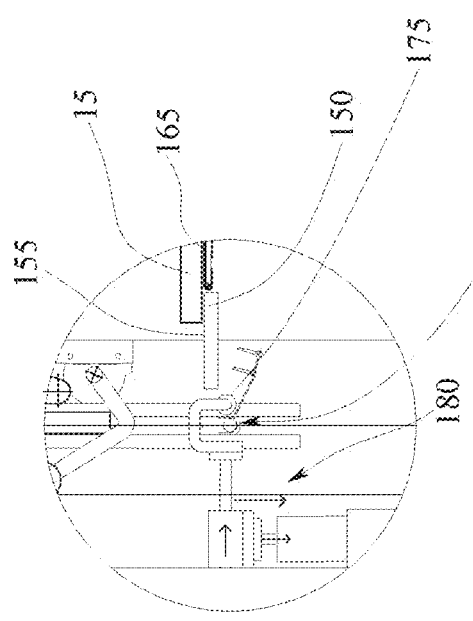
FIG. 22 is an enlargement of detail XXII of FIG. 9.
Figure 24:
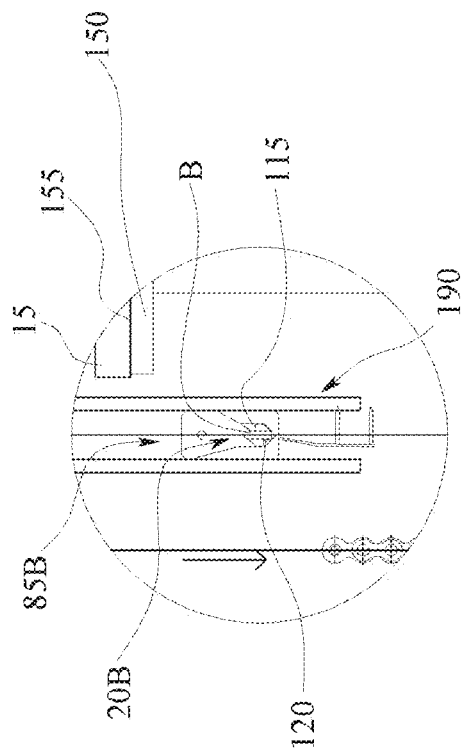
FIG. 24 is an enlargement of detail XIV of FIG. 12.

As shown in FIGS. 17 and 18, in a second embodiment of the sustaining element 20B, the sustaining element 20B comprises cylindrical portions E at the axial ends of the bar 45 and an abutment body B, for example shaped as a rectangular plate, rigidly fixed, or rigidly fixed without residual degrees of freedom, to an axial end of the bar 45. Preferably, the sustaining element 20B comprises a pair of abutment bodies B, each of which is rigidly fixed, or rigidly fixed without residual degrees of freedom, to the respective opposite axial ends of the bar 45.

Each abutment body B can be fixed, or fixed without residual degrees of freedom, in overhang to the corresponding axial end of the bar 45 and projects axially therefrom.

In the present description, the term "axially" means along the direction of the longitudinal axis of the bar 45 or of the central axis C of the respective cylindrical portion E of the bar 45 to which the abutment body is fixed.

In particular, the abutment body B can project with respect to a terminal surface, for example planar, of the axial end of the bar 45.

The abutment body B can comprise a first abutment surface S1 and a second abutment surface S2 opposite to the first abutment surface.

Said abutment surfaces S1,S2 can lay on parallel planes to the longitudinal axis of the bar 45. In the illustrated embodiments, the longitudinal axis of the bar 45 coincides with the central axis C of the cylindrical portion E.

In particular, the abutment surfaces S1,S2 can lie on perpendicular planes to the longitudinal axes of the needles 40.

Said abutment surfaces S1,S2 can be perpendicular to a plane perpendicular to the central axis C of the corresponding cylindrical portion E of the bar 45. For example, the first abutment surface S1 and the second abutment surface S2 are also planar and lie on parallel planes to said central axis C. Preferably, they are also parallel to each other. In the illustrated embodiment, the first abutment surface S1 and the second abutment surface S2 protrude radially from the respective end of the bar 45 to which is fixed the abutment body B. Where "radially" means in a radial direction with respect to the central axis C of the respective cylindrical portion E of the bar 45 to which the abutment body B is fixed.

In particular, the abutment body B projects radially with respect to the cylindrical portion E of the axial end of the bar 45 to which it is fixed, from diametrically opposite ends of the cylindrical portion E. That is to say, the first abutment surface S1 and the second abutment surface S2 protrude radially with respect to the cylindrical portion E of the axial end of the bar 45 to which it is fixed, from diametrically opposite ends of the cylindrical portion E.

In an embodiment not illustrated herein, the abutment surfaces S1,S2 may protrude only radially with respect to the axial end of the bar 45 to which the abutment body is fixed. The abutment body B comprises a pair of curvilinear joining surfaces, which have an axis of curvature parallel to the central axis C and are adapted to join the first abutment surface S1 with the second abutment surface S2, from ends of said abutment surfaces diametrically opposite with respect to the central axis C. Preferably said joining surfaces have a single axis of curvature parallel, and for example also eccentric, with respect to the central axis C.

The abutment body C can also be limited axially, in its distal portion from the bar 45, from a surface perpendicular to the central axis of the cylindrical portion E.

The abutment body B could be made of a single body with the bar 45. The abutment bodies B can be made of a single body with the respective bar 45.

The loading station 10, or a hooking system of the loading station 10, comprises an apparatus 70 for moving the sustaining elements 20A,20B (inside the loading station 10), which is configured so as to move a sustaining element 20A,20B, or so as to move the sustaining elements 20A,20B sequentially, at least at a hooking area of the loading station 10, in which a meat portion is fixed to a sustaining element 20A,20B.

Preferably, the movement apparatus 70 is configured to move the sustaining elements, i.e. it is configured so as to move the sustaining elements 20A,20B sequentially at least along a path that transits through the hooking area.

For example, said path lies on a vertical plane.

Preferably, the path is linear and continuous between an initial point upstream of the hooking area, in which the sustaining elements 20A,20B enter into the movement apparatus (or they are taken in thereby) and a final portion downstream of the hooking area, in which the sustaining elements to which respective meat portions 15 are hooked exit the movement apparatus (or they are drawn by it).

The movement apparatus can be associated to a frame T of the loading station 10, for example said frame T is provided with feet for bearing on the ground.

The movement apparatus 70 and the sustaining elements 20A,20B can be configured so that, in the hooking area, the needles 40 are arranged vertically upwards, i.e. with the pointed portions oriented upwards, and that the path has a rectilinear segment at the hooking area.

As shown in FIGS. 2-6, the loading station 10 can comprise a platform 75 provided with a resting surface for the sustaining elements 20A,20B, for example planar.

The resting surface can substantially define the hooking area.

That is, the hooking area can be defined as a space above the resting surface and which comprises the resting surface.

The movement apparatus 70 and the sustaining elements 20A,20B can then be configured so that in the hooking area the needles 40 are arranged upwards with longitudinal axes perpendicular to the resting surface of the platform 75. Or, the movement apparatus 70 and the sustaining elements 20A,20B can be configured so that the plate 50 of each sustaining element 20A,20B bears superiorly on the resting surface of the platform 75 and the needles 40 are arranged upwards with longitudinal axes substantially perpendicular to the resting surface.

In a first embodiment of the loading station 10 shown in the figure, the segment at the hooking area, at the path of motion of the sustaining elements 20A,20B defined by the movement apparatus 70, is positioned at a higher elevation with respect to the resting surface of the platform 75. This segment can for example be substantially horizontal.

In this embodiment, the resting surface can be inclined between plus or minus 30 degrees (±30°) with respect to a horizontal plane, it preferably lies substantially on a horizontal plane.

In both embodiments of the loading station 10, the loading station 10 comprises an actuation configured to change the inclination of the platform 75.

According to a variant, not illustrated herein, only a portion of the platform can be inclined by the actuation with respect to a fixed adjacent portion of the same platform 75.

In particular, the platform 75 is movable as a result of said actuation between a first position, in which the resting surface is substantially horizontal, and a second position, in which the resting surface is transverse with respect to a horizontal plane, for example it is vertical.

Furthermore, the platform 75 can be moved by the actuation in any intermediate position between the first position and the second position.

For example, the platform 75 is hinged at an end thereof and at the opposite end it is connected to a linear actuator 80, for example a pneumatic cylinder.

In the second embodiment of the loading station 10, the loading station 10 also comprises an additional platform, which is horizontal, fixed with respect to the frame T and it flanks the platform 75.

In addition, in said second embodiment, the path of motion of the sustaining elements 20A,20B defined by the movement apparatus 70 comprises a segment, for example substantially vertical, flanking the platform 75, when the platform is in the second position, so that passing from the second position to the first position the platform 75 contacts the sustaining element 20A,20B and, supporting it inferiorly, orients it with the needles 40 facing upwards.

Figure 21:
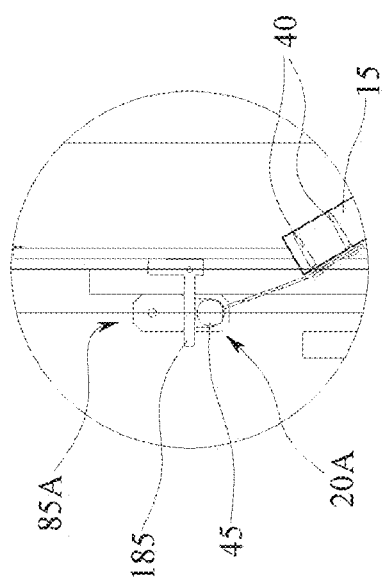
FIG. 21 is an enlargement of detail XXI of FIG. 7.
Figure 23:
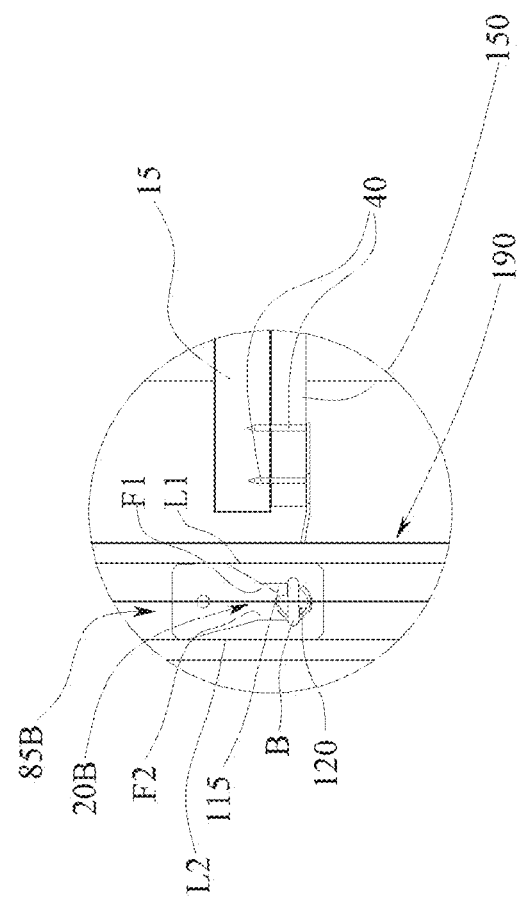
FIG. 23 is an enlargement of detail XXIII of FIG. 11.

In both embodiments of the loading station 10, the movement apparatus 70 can comprise a support element 85A,85B (FIG. 21 et seq.), for example a plurality of support element 85A,85B, to each of which can be associated a sustaining element 20A,20B.

For example each support element 85A,85B is able directly to hold a sustaining element 20A,20B in order to move it along the path defined by the movement apparatus itself. Each support element 85A,85B can be shaped so as to support inferiorly a portion of a sustaining element 20A, 20B, for example a portion of the bar 45, and to allow at least a partial rotation, of said sustaining element 20A,20B with respect to an axis lying on a plane perpendicular to the longitudinal axes of the needles 40, i.e. to allow a rotation with respect to the longitudinal axis of the bar 45.

For example, the sustaining element 20A,20B and the support element 85A,85B are so shaped that, when the sustaining element 20A,20B is received in the seat of the support element 85A,85B and there are no forces acting on the sustaining element 20A,20B it reaches the unperturbed position by gravity.

In a first embodiment of the support elements 85A illustrated in FIGS. 15 and 16 and configured to cooperate with the first embodiment of the sustaining elements 20A illustrated in FIGS. 13 and 14, each support element 85A comprises a U-shaped body, i.e. a body provided with a seat 90 able to house a portion of the bar 45 of the sustaining element 20A, for example the cylindrical portion E of an axial end of the bar 45.

Preferably, the movement apparatus 70 comprises a pair of support elements 85A for each sustaining element 20A, or for each bar 45, for example each able to receive and support inferiorly the cylindrical portion E of a respective axial end of the bar 45.

In particular, each support element 85A comprises a base 100, for example substantially shaped as a parallelogram, in which is obtained a bottom surface 95 of the seat, which bottom surface 95 has hemicylindrical shape and it is configured to receive (to measure) the cylindrical portion E of a respective axial end of the bar 45.

When the cylindrical portion E of a bar 45 is received in the seat 90, the central axis C of the cylindrical portion E is parallel, for example coaxial, to a central axis of the bottom surface, or is parallel, for example coaxial, to an axis of curvature of the bottom surface. Or in addition, it is parallel, for example coaxial, to the central axis of the semicylinder defined by the bottom surface 95.

Each support element 85A can comprise two lateral walls 105,110 that rise from the base 100, at the side of the bottom surface 95, for example mutually parallel.

The lateral walls 105,110 can have, each, a side surface F1,F2 that develops from the bottom surface 95 and is oriented towards the side surface F1,F2 of the other lateral wall 105,110.

Preferably, each side surface F1,F2 comprises a planar portion, lying on a plane parallel to the central axis of the bottom surface 95. Said planar portions are also mutually parallel.

The distance between the side surfaces F1,F2 can be such as to receive to measure, i.e. with reduced play, the cylindrical portion E of the bar 45.

The lateral walls 105,110 can comprise, each, a respective lateral surface L1,L2 external with respect to the seat 90.

In practice, the seat 90 is interposed between said lateral surfaces L1,L2, or it is at least interposed between the planes on which said lateral surfaces L1,L2 lie.

The lateral surfaces L1,L2 can be planar, mutually parallel and lie on planes parallel to the central axis of the bottom surface 95, for example they lie on planes parallel to a plane of symmetry of the bottom surface 95 containing the central axis S of the bottom surface 95.

Each support element 85A,85B is superiorly open, i.e. it has an opening in the opposite position to the bottom surface 95, able to be traversed by the bar 45. Or, between the lateral walls 105,110 is present an opening for the access of the bar 45 to the bottom surface 95.

The opening is connected to the bottom surface 95 by means of the side surfaces F1,F2 of the lateral walls 105,110.

The seat 90 can pass through with respect to a longitudinal axis of the bar 45, or it can pass through along the direction of the central axis S of the bottom surface 95.

In a second embodiment of the support elements 85B illustrated in FIGS. 19 and 20 configured to cooperate with the second embodiment of the sustaining elements 20B illustrated in FIGS. 17 and 18, each support element 85B comprises a U-shaped body, substantially shaped as in the first embodiment.

In addition with respect to the first embodiment, in the second embodiment of the support elements 85B, the support elements 85B comprise a first abutment body 115 and a second abutment body 120, for example housed inside the seat 90, and configured to cooperate with the abutment body B of the sustaining element 20B so as to limit a relative rotation of the sustaining element 20B with respect to the support element 85B, around the longitudinal axis of the bar 45, or around the central axis C of the cylindrical portions E, between a first end stop position and a second end stop position.

For example, between the first end stop position and the second end stop position the sustaining element 20B, or the bar 45 of the sustaining element 20B, effects a rotation between 80° and 100°, preferably 90°.

In the illustrated embodiment, the first abutment body 115 comprises a first abutment surface 115A and a second abutment surface 115B, lying on mutually orthogonal planes, and the second abutment body 120 comprises a first abutment surface 120A and a second abutment surface 120B, lying on mutually orthogonal planes.

The sustaining element 20B (in its second embodiment) is then rotatably associated to the support element 85B, for example by the coupling of the bottom surface 95 with the cylindrical portion E of the rod, and it is movable between the first end stop position, in which the first abutment surface S1 of the sustaining element 20B is in contact with the second abutment surface 115B of the first abutment surface 115 and the second abutment surface S2 of the sustaining element 20B is in contact with the second abutment surface 120B of the second abutment body 120, and the second position, in which the first abutment surface S1 of the sustaining element 20B is in contact with the first abutment surface 115A of the first abutment body 115 and the second abutment surface S2 of the sustaining element 20B is in contact with the first surface 120A of the second abutment body 120.

In the first illustrated embodiment, the first abutment surface 115A of the first abutment body 115 lies on a plane perpendicular to the lateral surfaces L1,L2 and parallel to the central axis S of the bottom surface 95. For example, it protrudes in overhang from a side surface F1.

The second abutment surface 115B of the first abutment body 115 can lie on a plane parallel to the lateral surfaces L1,L2.

The second abutment surface 115B of the first abutment body 115 can protrude in overhang from an end of the first abutment surface 115A of the first abutment body 115 opposite to the side surface F1, for example in the direction away from the bottom surface 95.

The first abutment surface 120A of the second abutment body 120 can lie on a plane perpendicular to the lateral surfaces L1,L2 and parallel to the central axis S of the bottom surface 95.

The second abutment surface 120B of the second abutment body 120 can lie on a plane parallel to the lateral surfaces L1,L2.

The second abutment surface 120B of the second abutment body 120 can protrude in overhang from an end of the first abutment surface 120A of the second abutment body 120 opposite to the side surface F2, for example in the direction away from the bottom surface 95.

The first abutment surfaces 115A,120A of the first 115 and of the second abutment body 120 are positioned at opposite sides with respect to a plane perpendicular to the lateral surfaces L1,L2 and passing through the central axis S of the bottom wall 95.

The second abutment surfaces 115B,120B of the first and of the second abutment body 120 are positioned at opposite sides with respect to a plane parallel to the lateral surfaces L1,L2 and passing through the central axis S of the bottom wall 95.

In both embodiments of the support elements 85A,85B, each support element 85A,85B can comprise a guiding portion, in proximity to the opening, shaped as a hopper, to facilitate the insertion of the bar 45 in the seat 90.

In addition, in both embodiments of the support elements, each support elements 85A,85B can comprise a foil integral with the base 100, for example substantially lying on a plane perpendicular to the central axis S of the bottom wall 95.

The foil can externally close the seat 90, or at an opposite side with respect to the one traversed by the bar 45.

Irrespective of the embodiment of the support element 85A,85B, the movement apparatus 70 can comprise means configured so as to move said support elements 85A,85B at least along the path, defined by the movement apparatus, along which the sustaining elements 20A,20B are moved.

In both embodiments of the loading station 10 and of the support elements 20A,20B, these means comprise an inextensible flexible member closed in a loop around (in contact) two or more pulleys or gear wheels, of which at least one driving, or driven, for the actuation of the flexible member itself.

The flexible member defines a path closed in a loop along which the support element 85A,85B are moved and which comprises the path along which the sustaining elements 20A,20B are moved.

In the illustrated embodiments, the support elements 85A,85B are directly associated to the flexible member, for example they are rotatably associated therewith by means of a horizontal hinge axis.

In particular, the support elements 85A,85B can be rotatably associated with the flexible member so that, in the absence of external forces, the support element 85A,85B hangs from the flexible member with the bottom surface 95 oriented upwards. Preferably so that a centreline plane of the bottom surface 95 containing the central axis S of the bottom surface is substantially perpendicular.

For example, the foil of the support element 85A,85B is rotatably associated to the flexible member, in a distal point thereof from the base 100.

Figure 3:
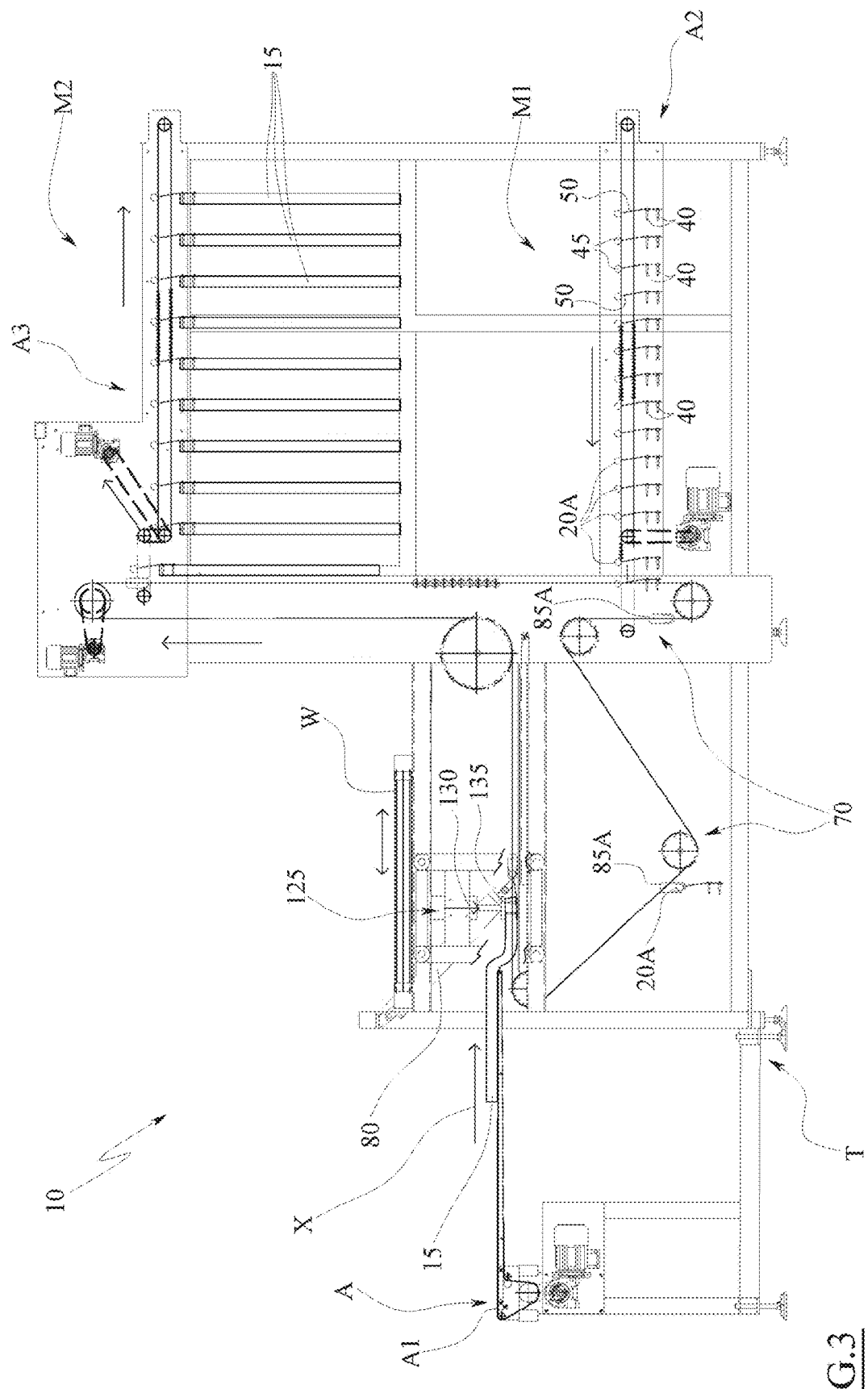
FIG. 3 is a schematic lateral view of the first embodiment of the loading station, shown in an operating step thereof subsequent to the operating step shown in FIG. 2.
Figure 4:
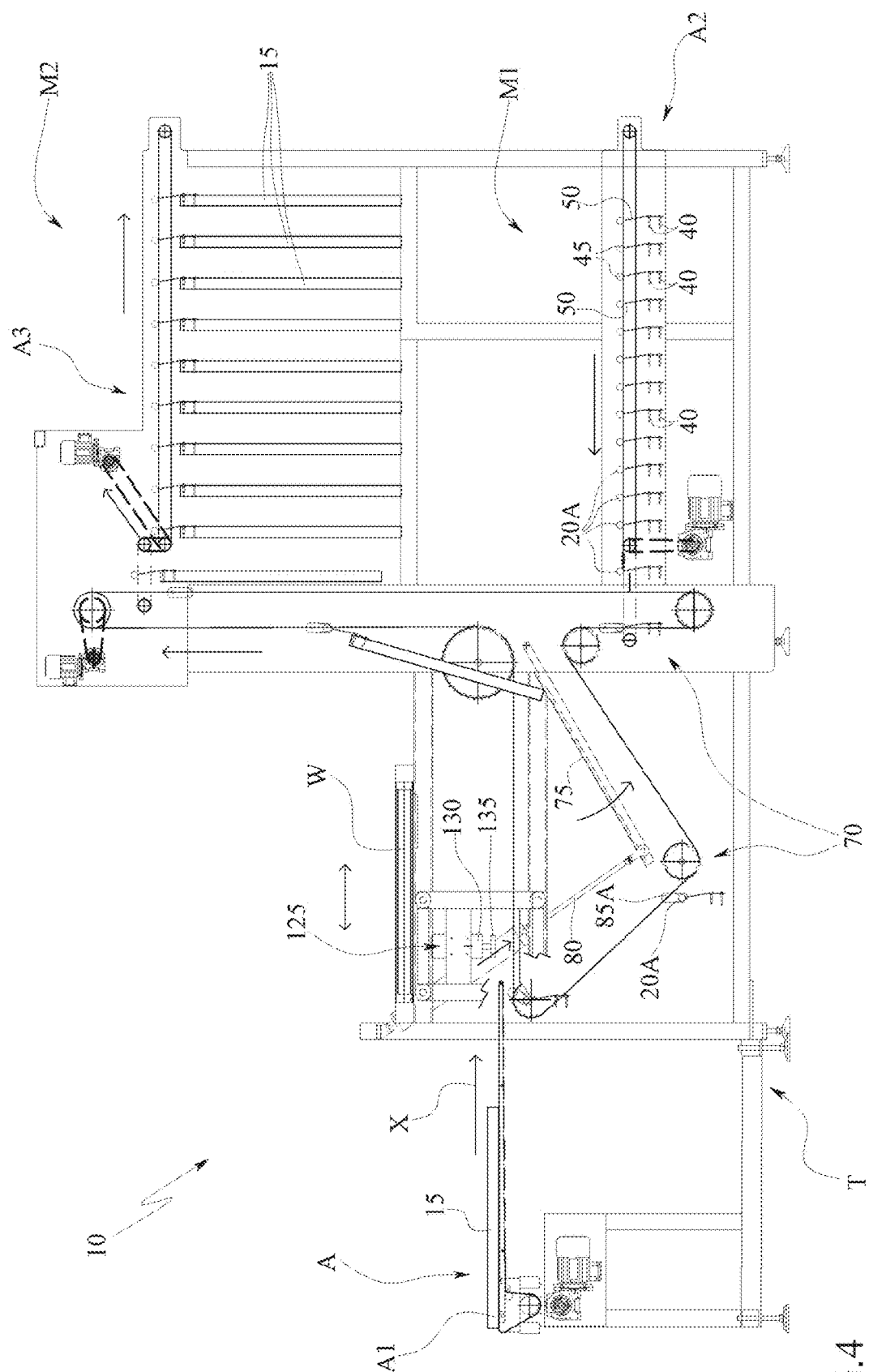
FIG. 4 is a schematic lateral view of the first embodiment of the loading station, shown in an operating step thereof subsequent to the operating step shown in FIG. 3.
Figure 5:
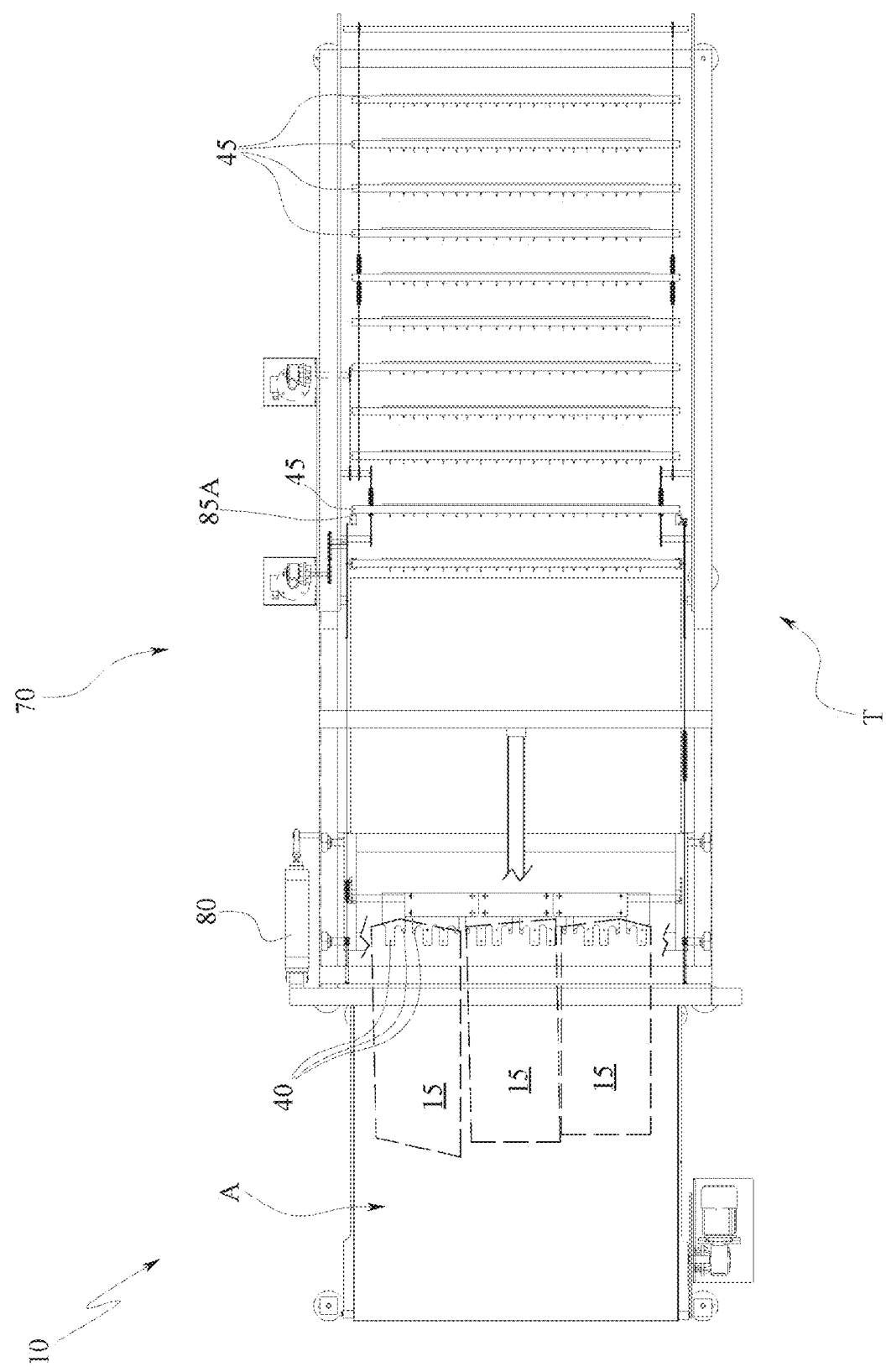
FIG. 5 is a section view according to the plane V-V of FIG. 2.

In the first embodiment of the loading station 10 illustrated in FIGS. 2-4, the closed path defined by the flexible member comprises at least a first vertical segment.

The closed path can then also comprise a second segment contiguous to the second segment, for example oblique, a third segment at the hooking area and for example horizontal.

Additionally it can comprise a fourth segment, for example vertical, which joins the first segment.

Figure 6:
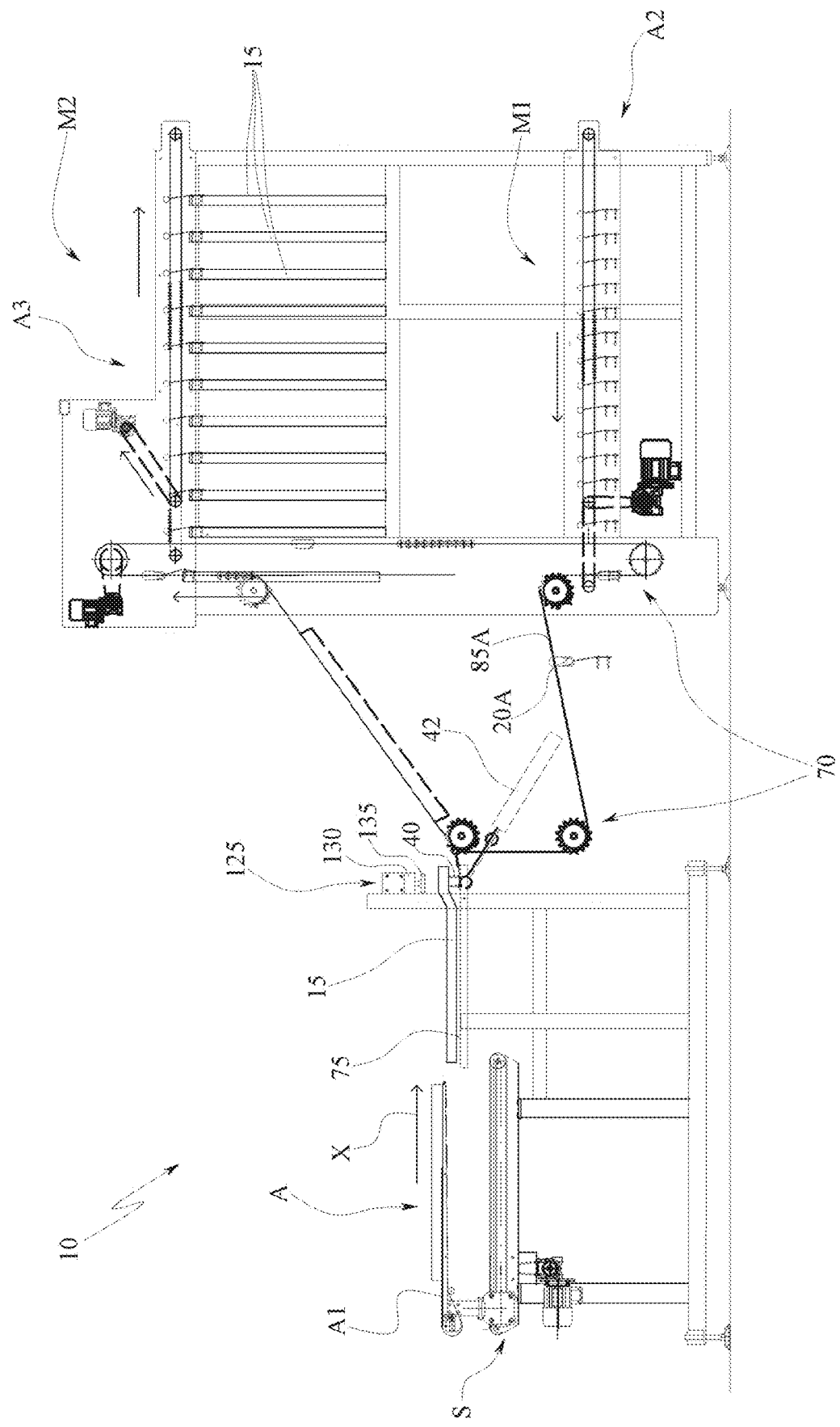
FIG. 6 is a schematic lateral view of a second embodiment of the loading station.

In the second embodiment of the loading station 10 illustrated in FIG. 6, the closed path defined by the flexible member comprises at least a first vertical segment.

It can then also comprise a second segment contiguous to the second segment, for example oblique, and a third segment at the hooking area and for example vertical.

Additionally it can comprise a fourth segment oblique and contiguous to the third segment, and a fifth vertical segment that joins the first segment.

In both embodiments of the loading station 10, the movement apparatus 70 comprises two inextensible flexible members closed in a loop around two or more pulleys or gear wheels. Said flexible members lie on mutually parallel planes and each of them is connected to a respective sustaining element 20A,20B of the pair of sustaining elements.

For example, the flexible member, i.e. each flexible member, is a chain (of the Galle type, i.e. for example with holed rollers). However, in an embodiment not illustrated herein the flexible member may be a belt or a cable.

In both embodiments of the loading station 10, the loading station 10, or the hooking system, comprises a conveying apparatus, which cooperates with the movement apparatus 70 to convey a meat portion 15 (or multiple meat portions 15) at the hooking area and to align a segment of the meat portion to the plurality of needles 40 of the sustaining element 20A,20B.

In particular, the conveying apparatus is configured to superpose a segment of the meat portion to the plurality of needles 40 of the sustaining element 20A,20B, or to deposit a segment of the meat portion on the plurality of needles 40 of the sustaining element 20A,20B.

For example, the conveying apparatus is configured to superpose the meat portion 15 so that the direction along which a thickness of the meat portion develops is parallel to the longitudinal axes of the needles 40.

In the illustrated embodiments, the conveying apparatus comprises a conveyor belt A defining a conveyance surface A1, for example planar, on which the meat portions 15 rest and are conveyed along a direction of conveyance X. For example, the direction of conveyance X is parallel to the direction in which the sustaining elements 20A,20B are moved at the hooking area, preferably the direction of conveyance X also has the same orientation of the direction in which the sustaining elements 20A,20B are moved at the hooking area.

The surface of conveyance A1 is at a higher elevation with respect to the platform 75, and, for example, flanks the resting surface in plan view. The conveyance surface A1 may be at least partially superposed in plan view on the resting surface.

In particular, the conveyor belt A comprises a conveying belt that is shaped so as to define the conveyance surface of the meat portions 15.

For example, the conveyance surface A1 of the conveyor belt A consists of an upper portion of the conveyor belt included between a pair of portions of said conveyor belt itself partially wound on a pair of end pulleys (or rollers).

The conveyor belt A, or the conveyance surface A1 defined thereby, has its length in the direction of conveyance X at least equal to the size in the same direction of the meat portions 15.

In the second embodiment of the loading station 10 illustrated in FIG. 6, the conveyor, i.e. the conveyor belt A, can translate horizontally for example, above the sustaining element 20A,20B present in the hooking area (or above the platform). In particular, the conveyor A is slidably associated with a support frame S with respect to a horizontal sliding axis.

In particular, the conveyor, or the conveyor belt A, can translate between a first position, in which the conveyor A is not superposed in plan view on the platform 75, and a second position, in which it is at least partially superposed in plan view on the platform 75. That is to say, in the first position the degree of superposition of the conveyor with respect to the platform 75 is minimum and in the second position the degree is maximum.

In addition, in both embodiments, the conveyor belt A could be pivoting at its distal end from the platform 75 with respect to a horizontal pivot axis, so that rotating the conveyor belt with respect to said pivot axis it is possible to change the elevation of the end of the conveyor belt proximal to the platform 75 with respect to the elevation of the end of the conveyor belt distal from the platform 75.

The loading station 10 can comprise a control unit that is operatively connected to the movement apparatus 70 and to the conveying apparatus, which control unit can be configured to coordinate the movement apparatus with the conveying apparatus.

In the first embodiment of the loading station 10, the control unit is configured to activate said apparatuses so that the conveying apparatus aligns a meat portion 15 to the needles 40, or deposits the meat portion on the needles 40, while the movement apparatus moves the sustaining element 20A,20B to which the meat portion 15 has to be hooked, for example at least along the rectilinear segment, at the hooking area, of the path.

That is to say, the control unit is configured so as to move the sustaining element 20A,20B and the meat portion 15 substantially at the same velocity (measured along an axis of the rectilinear segment of the path) at least at the hooking area.

In other words, the movement of the sustaining elements 20A,20B is not stopped during the step of positioning the meat portions 15 on the needles 40 in the hooking area.

The control unit is also configured to bring the platform 75 to the first position before a support element 85A,85B enters the hooking area, to support it inferiorly.

In addition, the control unit can be configured to activate the platform in the second position after the meat portion 15 was fixed to the respective sustaining element 20A,20B, so as to limit the oscillations of the meat portion 15 during its movement along the fourth segment of the path defined by the flexible member.

In the second embodiment of the loading station 10, the control unit is configured to activate the movement apparatus and the conveying apparatus so that the movement apparatus brings the platform 75 in the second position and, when a sustaining element 20A,20B is in a position flanking the platform 75, for example in the third segment of the path closed in a loop defined by the flexible member, stops the movement of the sustaining elements 20A,20B and actuates the platform 75 to bring it to the first position. Concurrently, the control unit is configured to activate the conveying apparatus in order to deposit the meat portion on the needles 40 while the movement of the sustaining elements 20A,20B is stopped.

In particular, the control unit activates the conveyor A to bring it to the first position and when the platform 75 is in the first position it activates the conveyor A to convey the meat portion 15 along the direction of conveyance X so as to deposit it on the needles 40.

In both embodiments of the loading station 10, the loading station 10, or the hooking system, comprises a press 125 able to press the meat portion 15, or the segment of the meat portion aligned by the conveying apparatus on the needles 40 of the sustaining element 20A,20B, present in the hooking area, to penetrate the meat portion 15 with said needle 40 and hooking the meat portion to the sustaining element 20A,20B. In particular, the press 125 is configured to press the meat portion 15 so that the needles 40 penetrate therein along the direction of the thickness of the meat portion.

The press 125 is also operatively connected, or controlled and commanded, to the control unit.

The press 125 can be placed at a higher elevation with respect to the platform 75 and comprises a base 130 and a contact element 135, which is able to directly contact the meat portions 15 and is movable along an axis, for example perpendicular to the resting surface of the platform 75, preferably vertical.

For example, the contact element 135 is movable along said axis between a first position, in which it does not interfere with the meat portion 15 present in the hooking area, and a second position, in which it directly contact the meat portion 15, so that in the passage from the first position to the second position, the contact element 135 contacts the meat portion and presses it against the needles 40 so as to penetrate the meat portion with the needles 40.

In the first position, the distance of the contact element 135 from the base 130 is minimum and in the second position the distance is maximum.

Preferably, the contact element comprises a plurality of holes 136 each adapted to house a respective needle 40 when the press 125 presses the portion of meat 15 present in the hooking area against needles 40 to hook the portion of meat to the sustaining element 20A, 20B.

Figure 26:
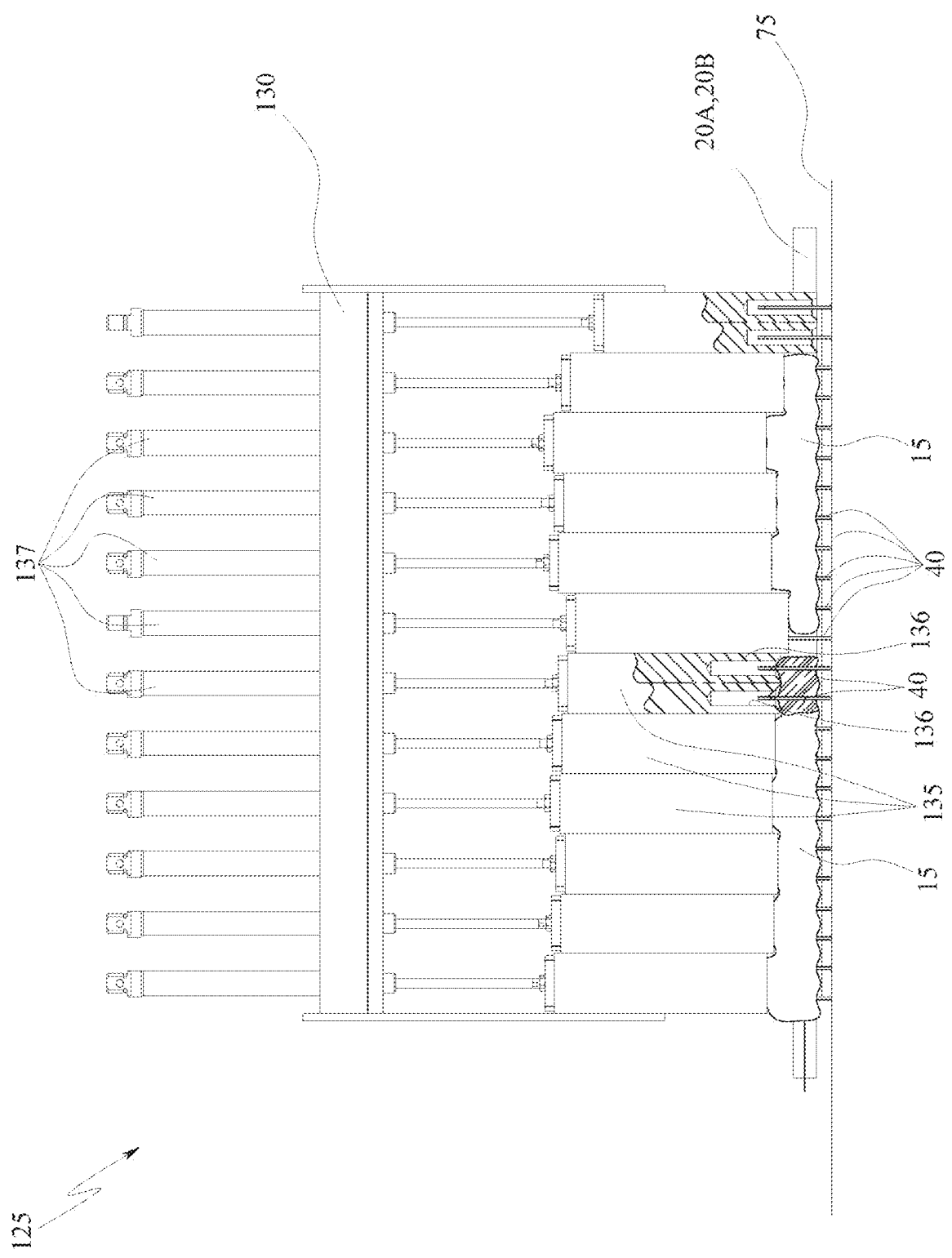
FIG. 26 is a front view of an embodiment of a press of the loading station according to the invention.

As illustrated in FIG. 26, the press can comprise a plurality of contact elements 135 flanking each other, for example in contact with each other, along a direction of flanking perpendicular to the feed direction of the meat portions at the hooking area, that is flanking each other along a direction parallel to the longitudinal axis of a sustaining element 20A, 20B when it is in the hooking area.

Said contact elements 135 are independent of each other, in particular they are each slidingly associated with the base 130 independently of the others along a respective sliding axis. This in such a way as to effectively press portions of meat 15 having irregular thickness and/or a plurality of portions of flanked meat along a direction perpendicular to that of motion at the hooking zone and having different thicknesses.

The sliding axes of each contact element 135 are for example perpendicular to the resting surface of the platform 75, preferably all the sliding axes are coplanar with each other.

Each contact element 135 is translated along the respective sliding axis by means of a respective actuator, preferably linear, mechanically independent of the linear actuators of the other contact elements 135.

Each actuator allows the motion of the respective contact element 135 between the first and second positions.

In the illustrated embodiment, each actuator comprises a pneumatic cylinder 137 (single-acting with spring return or double-acting) equipped with a first portion integral with the base 130 and a second portion, movable with respect to the first portion along the sliding axis and to which the contact element 135 is fixed.

The pneumatic cylinders 137 can be connected to a single inlet duct of pressurized air in which a pressure meter is inserted which, upon reaching a pre-set maximum pressure, interrupts the delivery of pressurized air to the pneumatic cylinders. Preferably, the pressure meter not only evaluates the reaching of a pre-set maximum pressure value before stopping the inflow of pressurized air, but waits, starting from the moment in which the pre-set value has been reached, for a predetermined time interval (before stopping the inflow of pressurized air to the pneumatic cylinders 137). This allows guaranteeing the fixing to the sustaining elements also of portions of meat which have some points with greater hardness than the average hardness of the portions of meat for which the plant is designed, without requiring pressure recalibrations.

This system can be assisted by an electro-mechanical system, for example a cam system, which acts on each contact element 135 to move it only from the second position to the first position, practically moving it away from the portion of meat just pressed. This peculiarity can allow a safer disengagement of the contact element 135. In an embodiment not illustrated, each actuator can comprise an electromechanical actuator such as for example a cam mechanism.

In the second embodiment of the loading station 10, the base 130 is fixed, without residual degrees of freedom, to the frame T of the loading station 10.

In this embodiment, the control unit is configured to activate the contact element 135 along the axis so it presses the meat portion against the needles 40 when the platform 75 is in the first position and to arrest the movement apparatus in the position reached (at the time when the platform it brought to the position) at least until the contact element 135 is actuated from the second position towards the first.

In the first embodiment of the loading station 10, the base 130 is slidably associated to the frame T of the loading station 10, for example with respect to an axis of translation parallel to the direction of the rectilinear segment of the path of the sustaining elements 20A,20B at the hooking area, preferably horizontal.

Substantially, it is preferable that the press 125 and the conveyor be configured so that at least one of them translates with respect to the other along an axis of translation, for example horizontal.

In said first embodiment, the control unit is configured to synchronise the translation of the base 130 along the axis of translation with the movement of the sustaining element 20A,20B at the hooking area.

For example, the press 125 comprises an actuator W configured to move the base 130 along the axis of translation and activated by the control unit so that the velocity and the direction of motion of the base 130 along the axis of translation is equal to the velocity and to the direction of motion of a sustaining element 20A,20B, or of a support element 85A,85B to which is connected a sustaining element 20A,20B, present in the hooking area and to which a meat portion 15 has to be hooked, or on which the conveying apparatus previously deposited a meat portion 15.

In both embodiments of the loading station 10, the loading station 10 comprises an automated magazine M1 of the sustaining elements 20A,20B configured to store the sustaining elements 20A,20B and to associate them to the movement apparatus, for example to connect them to the support elements 85A,85B of the movement apparatus 70.

The magazine M1 defines a path for the sustaining elements 20A,20B which ends at the path of the support elements 85A,85B defined by the movement apparatus 70. The junction area between the two paths defines the starting point of the path of motion of the sustaining elements 20A,20B along the movement apparatus 70.

For example, the automated magazine M1 of the sustaining elements 20A,20B comprises a conveyor A2, an off-loading end whereof is positioned at the path of the support element 85A,85B defined by the movement apparatus, so as to deposit, or let fall, a sustaining element 20A,20B in the seat 90 of a respective support element 85A,85B, for example in the seats 90 of a respective pair of support elements 85A,85B. In particular, the aforesaid junction area is in proximity to the first segment of the path defined by the movement apparatus for the support elements 85A,85B. Preferably, a lower portion of said first segment.

The conveyor can comprise for example two conveyors arranged in series, preferably two chains closed in a loop on two respective gear wheels and arranged in series with respect to one another.

In both embodiments of the loading station 10, the loading station 10 comprises an automated magazine M2 of the sustaining elements 20A,20B to which is hooked a meat portion, configured to draw the sustaining elements downstream of the hooking area, or after a meat portion 15 is hooked thereto, for example to draw the sustaining elements 20A,20B from the support elements 85A,85B of the movement apparatus 70, or from the seats 90 of the support elements 85A,85B in which are received the bars 45 of the sustaining elements 20A,20B.

The magazine M2 defines a path for the sustaining elements 20A,20B which intersects the path of the support elements 85A,85B defined by the movement apparatus 70. The intersection area between the two paths defines the ending point of the path of motion of the sustaining elements 20A,20B along the movement apparatus 70.

This automated magazine M2 is at least partially superposed in plan view to the magazine M1.

For example, the automated magazine M2 of the sustaining elements 20A,20B comprises a conveyor A3 that intersects the path of the support elements 85A,85B defined by the movement apparatus 70, so as to intercept, supporting inferiorly, a sustaining elements 20A,20B so as to extract it from the seat 90 of a respective support element 85A,85B, for example from the seats 90 of a respective pair of support elements 85A,85B.

In particular, the aforesaid junction area is in proximity to the first segment of the path defined by the movement apparatus 70 for the support elements 85A,85B. Preferably, an upper portion of said first segment.

The conveyor A3 can comprise for example a pair of chains, defining horizontal conveyance surfaces, flanking each other along a horizontal direction and interposed between at least one portion of the two flexible members of the movement apparatus. With particular reference to FIGS. 7-12, an unloading station 145 of the meat portions 15 is illustrated which is a part of processing plant of the meat portions 15, for example it is a part of the processing plant of the mat portion 15 that is provided with the loading station 10.

However, it is evident that the unloading station 145 could be constructed independently of the loading station 10 and hence it can deserve its own protection, separate from the presence of the loading station 10. The unloading station 145 is not directly connected to the loading station 10, because between them there may be stations for processing the meat portions 15 or otherwise magazines independent of the sustaining elements, with and without the meat portions 15.

The plant for processing the meat portions 15 can comprise a station for slicing the meat portions 15 positioned downstream of the unloading station 145 with respect to the direction of the work flow of the meat pieces inside the plant.

Obviously, the unloading station 145 needs the sustaining elements 20A,20B described above.

The unloading station 145 configured so as to unhook a meat portion 15 from a sustaining element 20A,20B to which it had previously been fixed.

In particular the unloading station 145 comprises an unhooking system configured so as to unhook a meat portion from a sustaining element 20A,20B to which it had previously been fixed.

The unloading station 145, or the hooking system, comprises an abutment body 150, for example plate-like, provided with an abutment surface 155 able to contact and support inferiorly the meat portions 15.

Said abutment surface 155 can lie on a plane inclined by +/−30° with respect to a horizontal plane, for example it lies substantially on a horizontal plane.

The abutment body 150 can have a protuberance shaped so as to be inserted in the inlet 55 of the plate 50 of the sustaining element 20A,20B. In particular, said protuberance is shaped so as to be inserted in the inlet 55 of the plate 50.

In the illustrated embodiment, the abutment body 150 comprises a plurality of protuberances, shaped so as to be inserted in the inlets 55 of the plate 50.

The abutment body 150 can be fixed, for example without residual degrees of freedom, to a frame T2 of the unloading station 145. The frame T2 can be provided with feet for resting on the ground.

The unloading station 145 can comprise a conveyor 160 flanking the abutment body 150 and configured to move the meat portions 15 that are brought to rest on the abutment body 150.

In some embodiments, the conveyor could rotate around a horizontal axis of rotation to bring the non-motorised end upwards so as to promote the bearing of the meat portions. For example, said conveyor 160 defines a conveyance surface 165, which is positioned at least partially at an equal or lower elevation with respect to the abutment surface 155. In the illustrated embodiment, the conveyor 160 comprises a conveyor belt defining said conveyance surface 165.

The unloading station 145, or the unhooking system, comprises a movement apparatus 170 of the sustaining elements 20A,20B configured to move at the abutment body 150 said sustaining elements to which a meat portion 15 is hooked.

The movement apparatus 170 of the unloading station 145 can be configured to move the sustaining elements 20A,20B, or so as to move the sustaining elements 20A,20B sequentially, at least along a path that transits at the abutment body 150.

This path comprises a segment, for example substantially vertical, preferably also rectilinear, in proximity to the abutment body 150.

In particular, along said segment the sustaining element 20A,20B is moved by the movement apparatus 170 between a first position, in which the sustaining element 20A,20B is at a higher elevation than the abutment surface 155, and a second position, in which the sustaining element 20A,20B that is at a lower elevation than the abutment surface 155, so that in the passage from the first position to the second position the meat portion 15, or only the meat portion 15, goes at least partially to rest on the abutment surface 155 so that the needles 40 are flanking the abutment surface 155 in plan view and are extracted from the meat portion.

The movement apparatus can comprise a support element, preferably a plurality of support element, for a sustaining element 20A,20B.

In the illustrated embodiment, the support element to which the sustaining element 20A,20B is associated is moved at least between said first and second position, dragging the sustaining element 20A,20B with it.

These support elements can be the support elements 85A,85B of the loading station 10, i.e. both the first embodiment of the support elements 85A and the second embodiment of the support elements 85B.

The movement apparatus of the unloading station 145 comprises means configured so as to move said support elements 85A,85B at least along said segment.

These means can for example comprise an inextensible flexible member closed in a loop around (in contact) two pulleys or gear wheels, of which at least one driving, or driven, for the actuation of the flexible member itself.

The flexible member of the unloading station 145 defines a path closed in a loop along which the support elements 85A,85B are moved and which comprises the path along which the sustaining elements 20A,20B are moved.

The support elements 85A,85B can be directly associated to the flexible member, for example they are rotatably associated therewith by means of a horizontal hinge axis.

The closed path defined by the flexible member can comprise at least a first vertical segment followed by a second vertical segment that joins the first and the flanks the abutment body 150.

In the illustrated embodiment, the movement apparatus 170 of the unloading station 145 comprises two inextensible flexible members closed in a loop each around two or more pulleys or gear wheels. Said flexible members lie on mutually parallel planes and each of them is connected to a respective sustaining element 20A,20B of the pair of sustaining elements 20A,20B.

The flexible member, i.e. each flexible member, is a chain (of the Galle type, i.e. with roller). However, in an embodiment not illustrated herein the flexible member may be a belt or a cable.

The movement apparatus 170 can be associated to the frame T1 of the loading station 10.

The loading station 10, or the unhooking system, can comprise a rotation limiter device, which is configured to limit a relative rotation of the sustaining element 20A,20B with respect to the support element 85A,85B, or is configured to limit the relative rotation between the cylindrical portion E of the sustaining element 20A,20B and the seat 90 of the support element 85A,85B.

Figure 7:
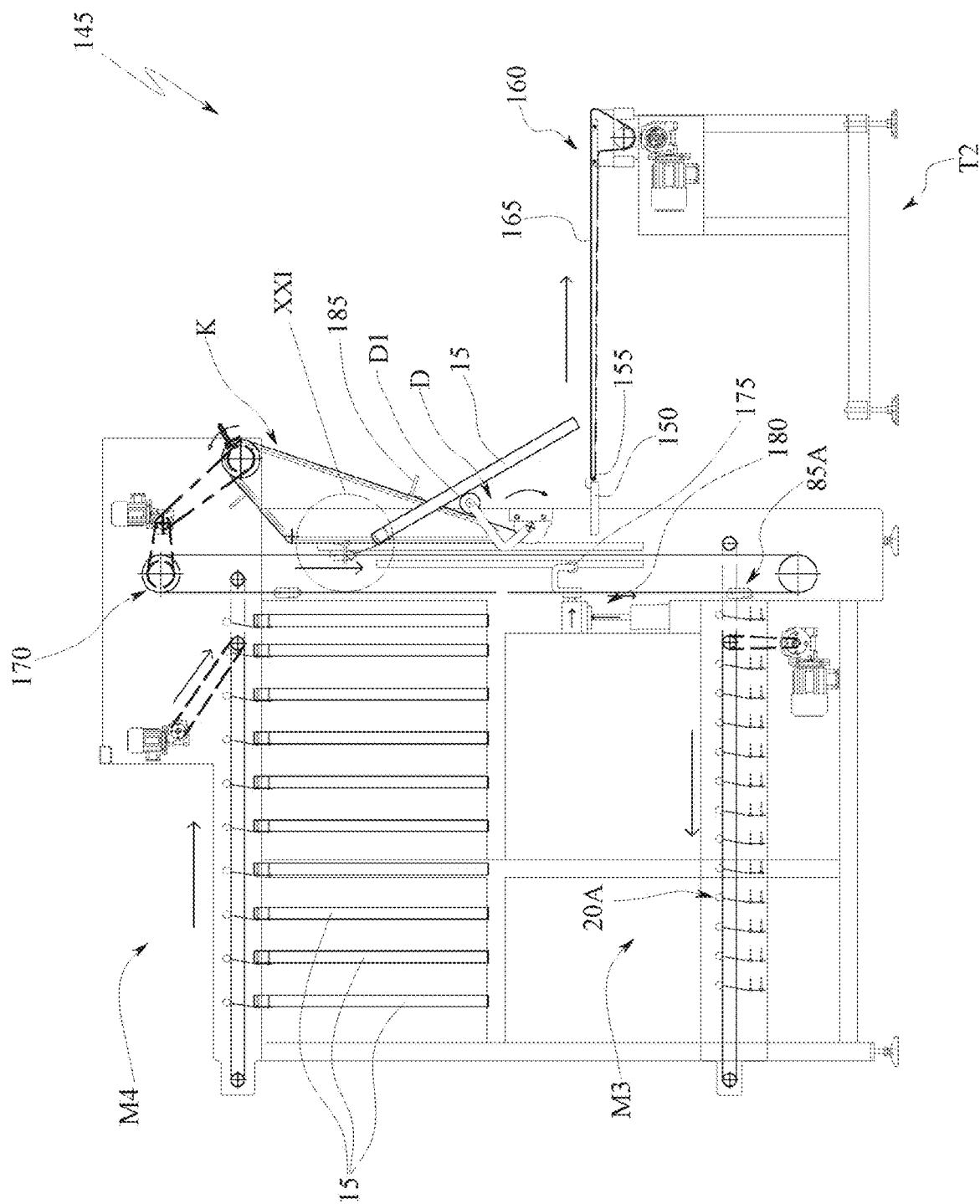
FIG. 7 is a schematic lateral view of a first embodiment of the unloading station, shown in an operating step thereof.
Figure 8:
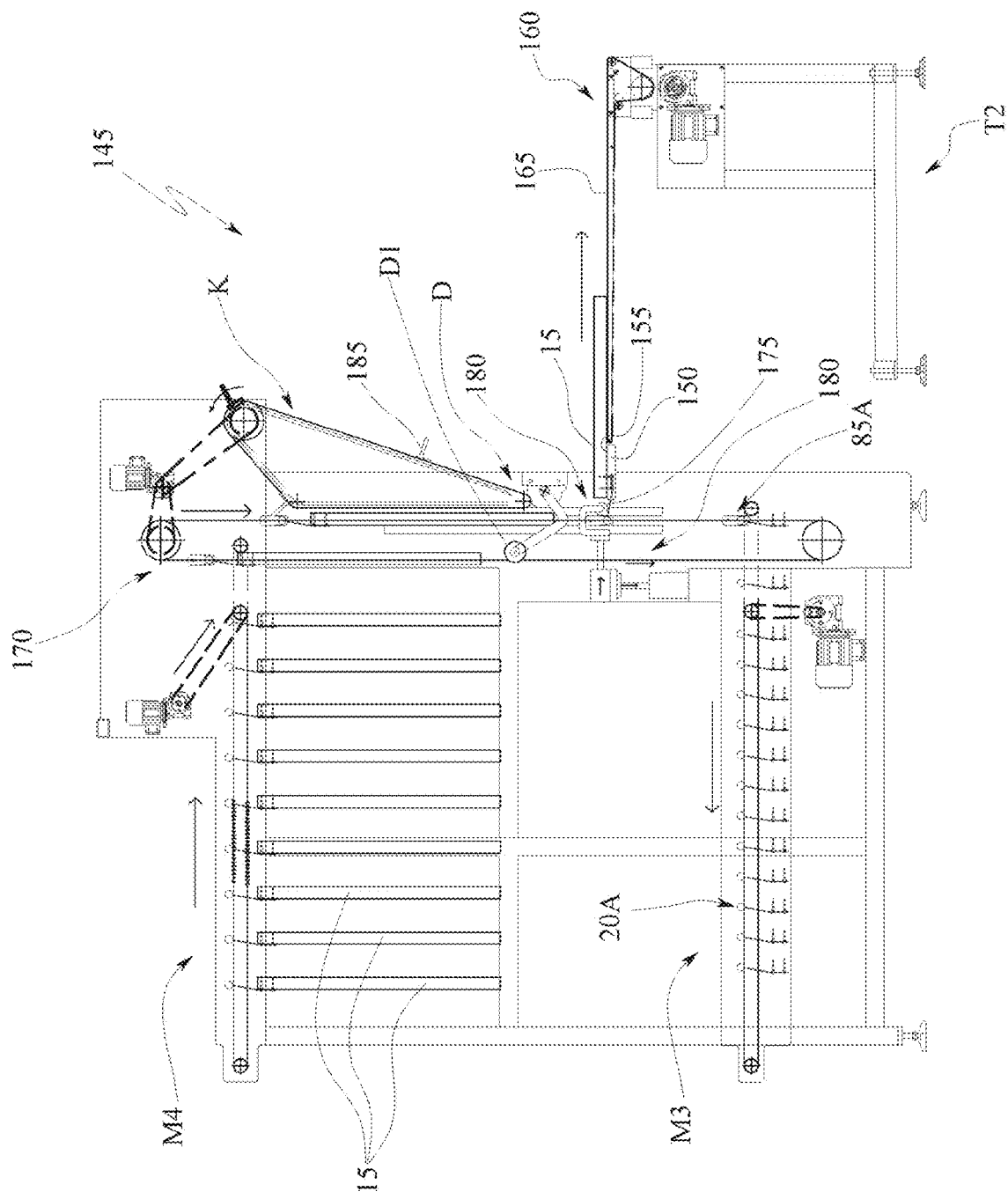
FIG. 8 is a schematic lateral view of the first embodiment of the unloading station, shown in an operating step thereof subsequent to the operating step shown in FIG. 7.
Figure 9:
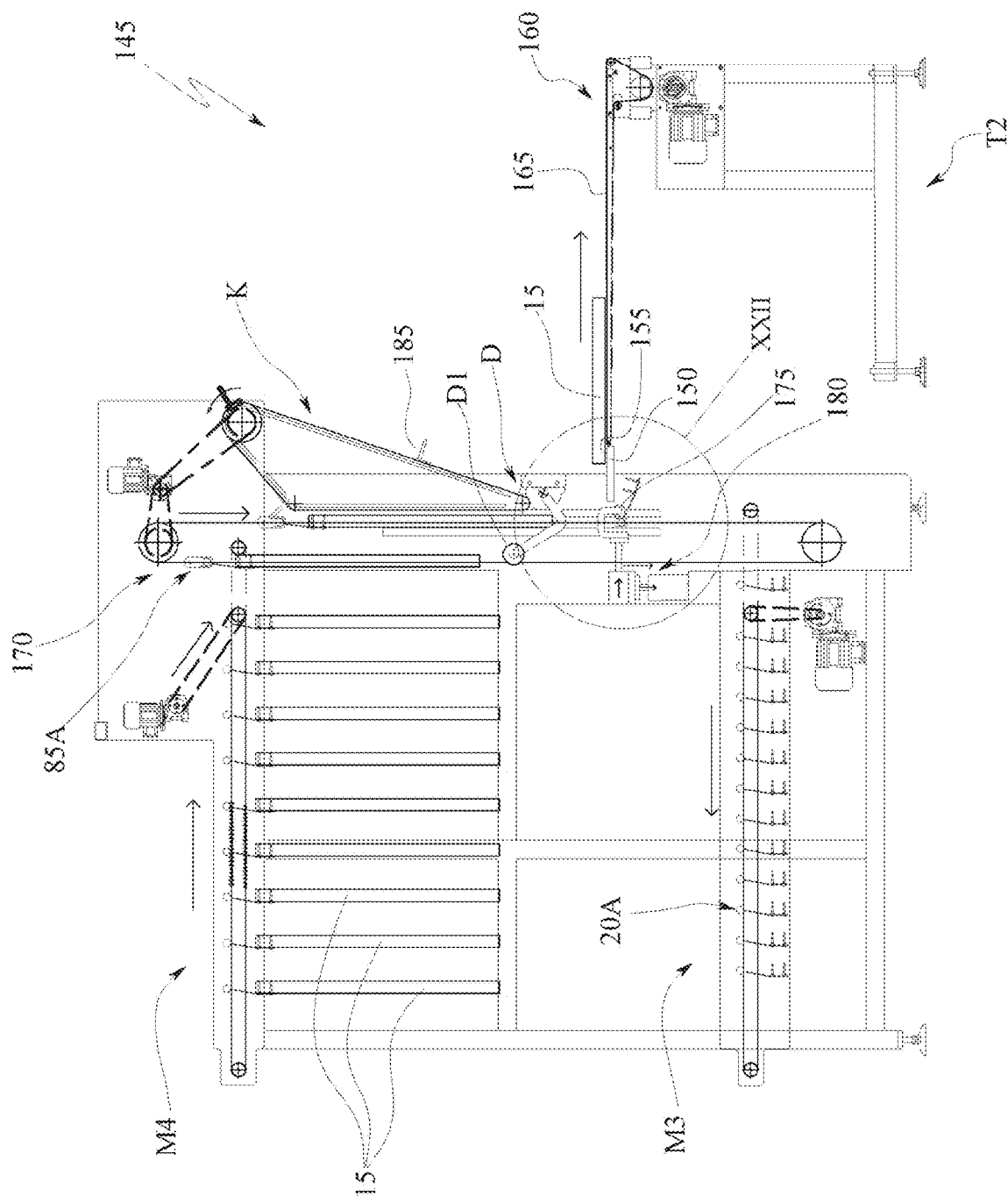
FIG. 9 is a schematic lateral view of the first embodiment of the unloading station, shown in an operating step thereof subsequent to the operating step shown in FIG. 8.

In a first embodiment, illustrated in FIGS. 7-9, of the unloading station 145, in which the sustaining element 20A is like in the first embodiment of the sustaining element 20A and the support element 85A is like in the first embodiment of the support element 85A, the rotation limiter device can be configured to prevent the relative rotation, from a position in which the needles 40 are oriented substantially horizontal, or from the unperturbed position, beyond an end stop position in which the needles 40 are oriented upwards, for example with longitudinal axes substantially perpendicular to an axis of lay of the abutment surface 155.

In said first embodiment of the unloading station 145, the limiter device comprises a buffer 175 able to contact the sustaining element 20A directly and an actuating mechanism 180 of said buffer 175 configured to allow the movement of said buffer 175 along a vertical axis and along a horizontal axis.

Said actuation mechanism 180 is operatively connected to the control unit, which is configured to activate the actuation mechanism 180 so that the buffer 175 is movable between a first position, in which the buffer 175 does not act on the sustaining element 20A and does not hinder its movement, and a second position, in which the buffer 175 is positioned substantially at the same elevation as the bar 45 of the sustaining element 20A and it flanks it so as to contact the plate 50 superiorly and to prevent the relative rotation beyond the end stop position in which the needles 40 are oriented upwards, for example with longitudinal axes substantially perpendicular to an axis of lay of the abutment surface 155.

Preferably, in the second position the actuation mechanism 180 is configured to move downwards in synchrony with the sustaining element 20A, or with the support element 85A.

In this first embodiment of the unloading station 145, the unloading station 145 comprises a retaining device K configured to prevent an extraction of the sustaining element 20A, or of the bar 45 of the sustaining element 20A, from the seat 90 of the support element 85A, when the sustaining element is moved from the first position to the second position of the movement apparatus.

For example, said retaining device K comprises a belt closed in a loop on three pulleys or rollers or gear wheel, which is provided with at least one segment that slides vertically flanking the path of motion of the sustaining elements and of at least one blade 185 integral with the belt.

The movement of the belt is configured so that the blade 185 positions itself superposed in plan view to the bar 45 of a sustaining element 20A at such an elevation that it prevents extraction with respect to the seat 90 of the support element 85A.

Figure 10:
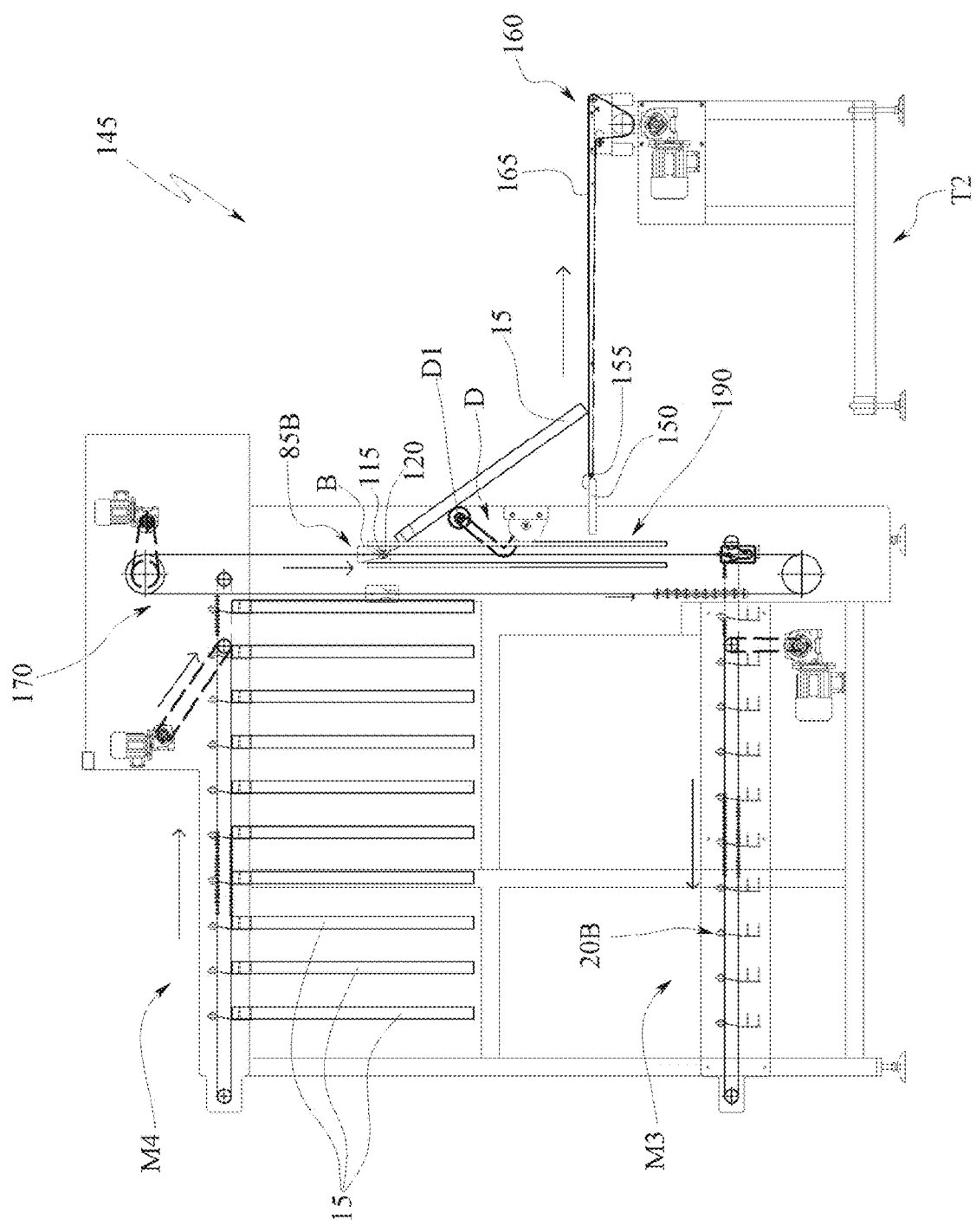
FIG. 10 is a schematic lateral view of a second embodiment of the unloading station, shown in an operating step thereof.
Figure 11:
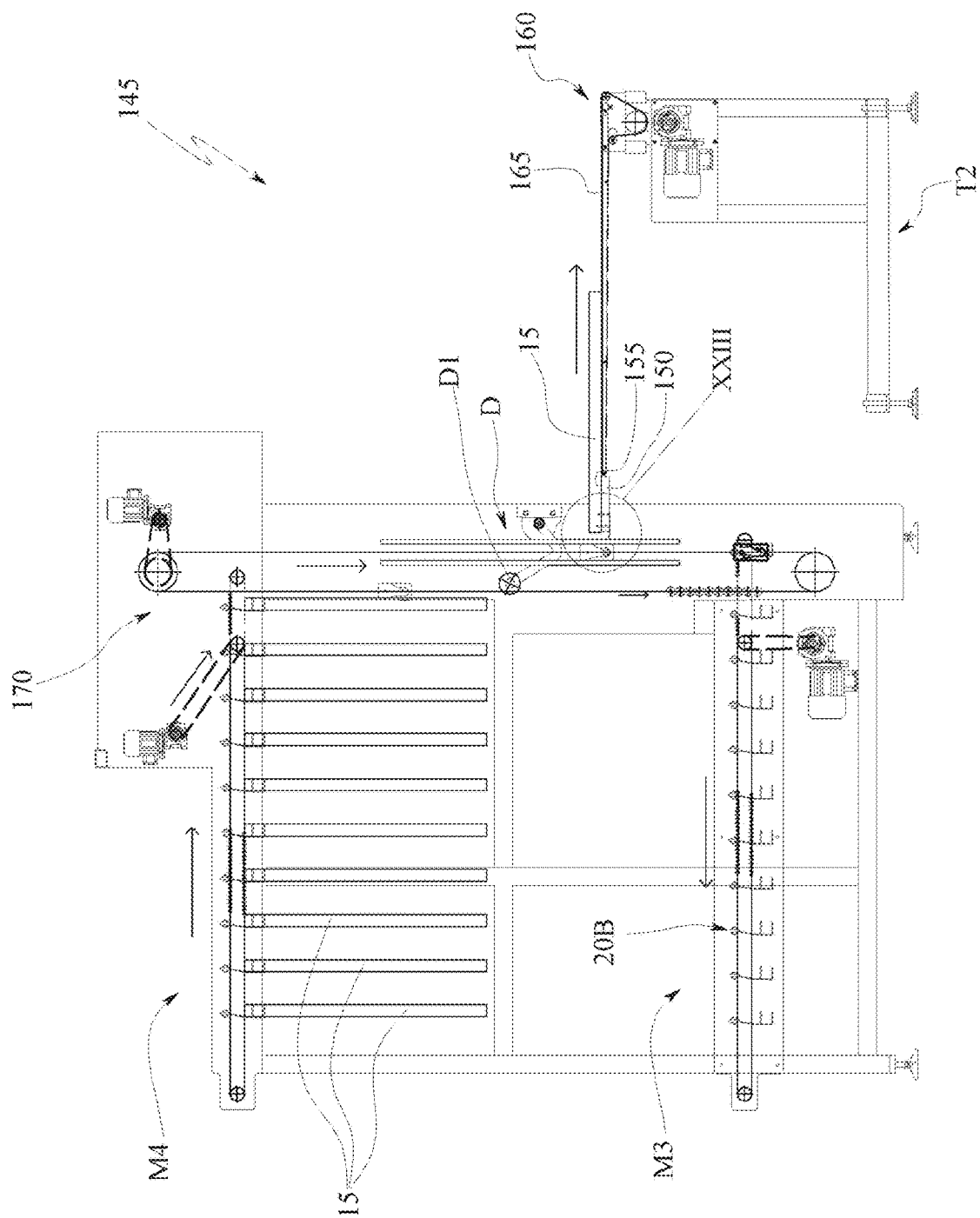
FIG. 11 is a schematic lateral view of the second embodiment of the unloading station, shown in an operating step thereof subsequent to the operating step shown in FIG. 10.
Figure 12:
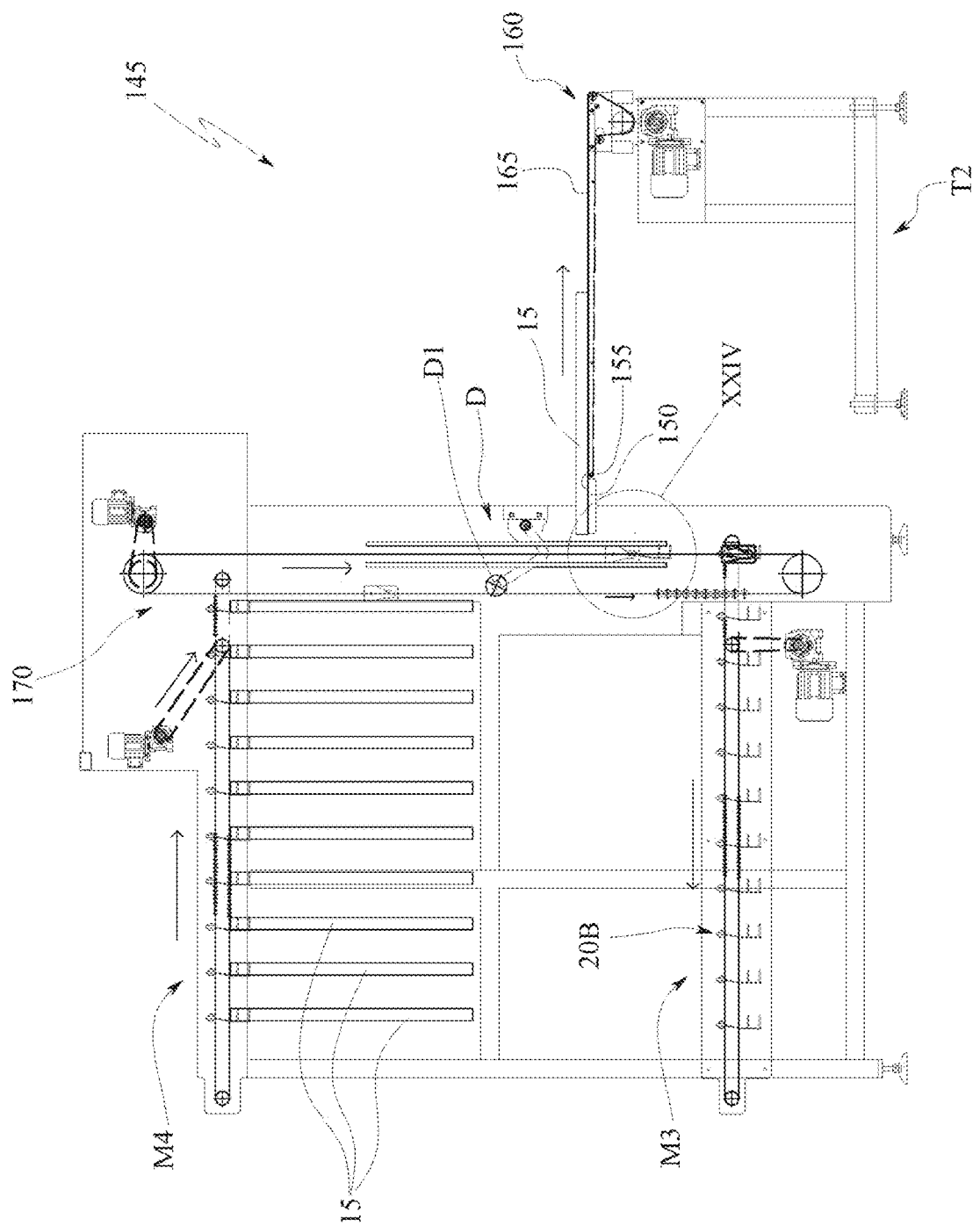
FIG. 12 is a schematic lateral view of the second embodiment of the unloading station, shown in an operating step thereof subsequent to the operating step shown in FIG. 11.

In a second embodiment of the unloading station 145, illustrated in FIGS. 10-12, in which the support element 85B is like in the second embodiment of the support element 85b and the sustaining element 20b is like in the second embodiment of the sustaining element 20B, the limiter device comprises the support element 85 and the sustaining element 20B, in particular the abutment bodies B of said sustaining elements.

Therefore, in this embodiment the limiter device is configured to allow a relative rotation of the sustaining element 20B with respect to the support element 85B between a first end stop position in which the needles 40 are arranged with the longitudinal axes horizontal, i.e. corresponding to the unperturbed position, and a second end stop position, in which the needles 40 are positioned with longitudinal axes perpendicular to an axis of lay of the abutment surface 155 and are oriented upwards.

In the passage from the first end stop position and the second end stop position, the sustaining element 20B, i.e. the bar 45 of the sustaining element 20B, performs a rotation with respect to the support element 85B substantially by 90°.

In both embodiments of the unloading station 145 the unloading station 145 can comprise a guide 190 configured to prevent a rotation of the support element 85B with respect to at least one horizontal axis.

For example, said guide 190 realizes a prismatic connection with the support element 85B in particular with the lateral walls of the support element 85B.

The guide 190 is positioned at the segment of motion of the sustaining elements 20B defined by the movement apparatus of the unloading station 145.

For example, said guide 190 extends from a higher to a lower elevation with respect to the abutment body 150.

In both embodiments of the unloading station 145, the unloading station 145 can comprise a tilting device D configured to tilt the support element 85B with respect to the unperturbed position in the direction of approach to the abutment body 150.

For example said tilting device D comprises an abutment element, preferably a roller D1, which is movable between a first position, in which the distance along a horizontal direction of the abutment element from the abutment body 150 is the longest, and a second position, in which said distance is the shortest. The tilting device D is positioned so that in the passage from the first position to the second position contacts the meat portion 15 setting the sustaining element 20B in rotation with respect to the support element 85B and approaching the meat portion to the support element 85B.

The unloading station 145 can also comprise an automated magazine M3 of the sustaining elements 20A,20B and an automated magazine M4 of the sustaining elements 20A,20B with the hooked meat portions 15, substantially similar to those of the loading station 10.

The operation of the loading station 10 and of the unloading station 145 according to the invention is described below.

According to a first embodiment of the loading station, described with reference to FIGS. 1 to 5, the operation of the plant I provides for the meat portions 15 are made to advance along the hooking area of the loading station thanks to the conveyor belt A, whose feed velocity is controlled and regulated by the electronic control unit of the plant. The control unit also controls and regulates the feed velocity of the movement apparatus 70 of the sustaining elements 20.

Figure 1:
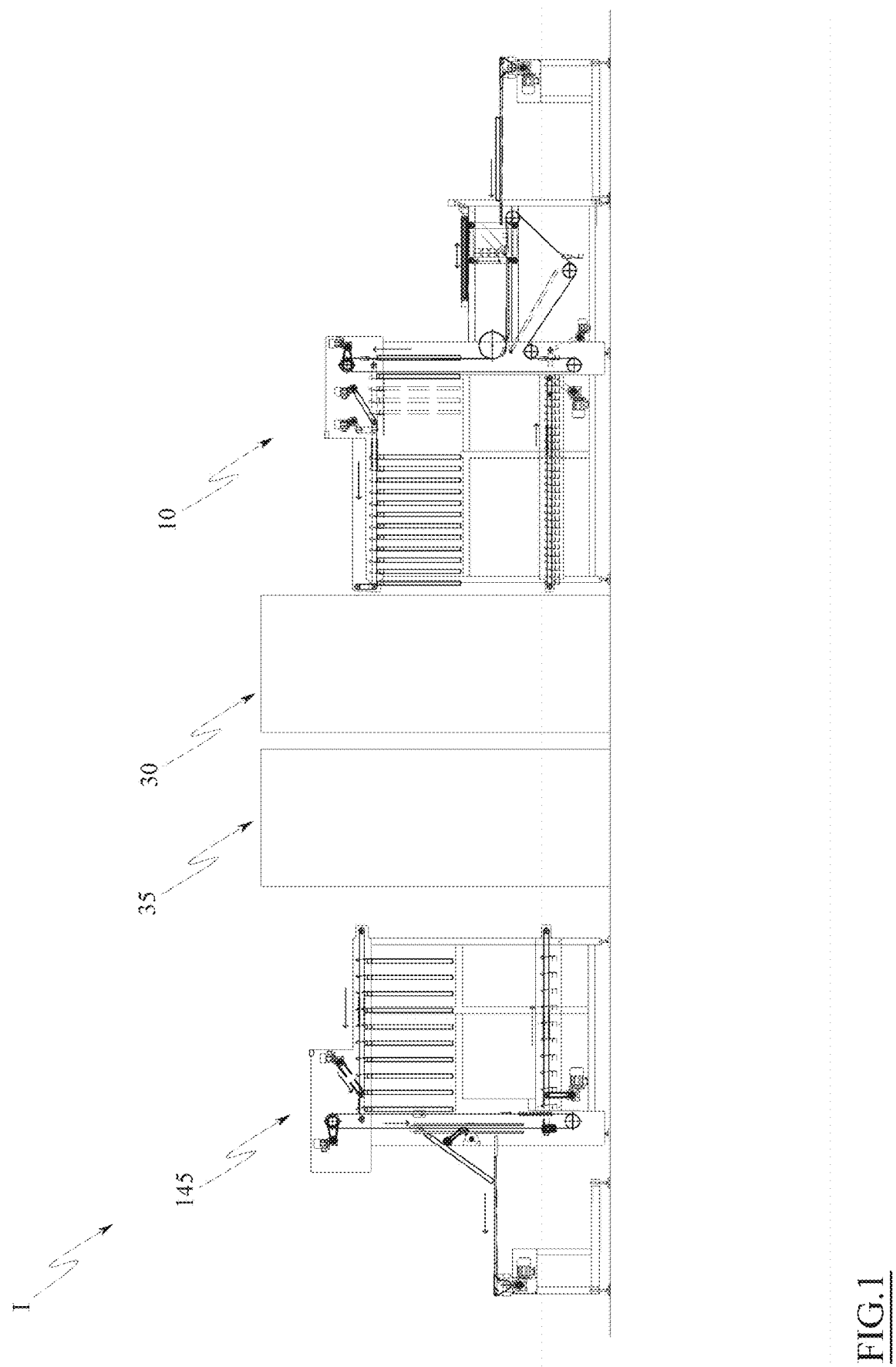
FIG. 1 is a schematic lateral view of a plant for processing meat portions provided with a loading station, an unloading station and sustaining elements for meat portions according to the invention.

In particular, the movement apparatus 70 is activated by the control unit so that when the needles 40 rest on the platform 75, which is in the first horizontal working position, at the free edge of the conveyor belt A the ends of the meat portions 15 rest on the needles themselves as shown in FIG. 1. In this position, the movement apparatus and the belt A advance at the same velocity (FIG. 2). The press 125 is then activated by the control unit so as to move the base 130 along the axis of translation and so that the velocity and the direction of motion of the base 130 along the axis of translation is equal to the velocity and to the direction of motion of a sustaining element 20A,20B, or of a support element 85A,85B to which is connected a sustaining element 20A,20B, present in the hooking area and to which a meat portion 15 has to be hooked, or on which the conveying apparatus previously deposited a meat portion 15. During the translation of the base 130 of the press 125, the control unit commands the translation of the contact element 135 of the press 125 between the first and the second position in which the contact element 135 exerts a pressure on the meat portion 15 and presses it against the needles 40 so as to penetrate the meat portion with the needles 40.

At this point, the meat portion 15 is hooked to the needles 40 of the sustaining element 20 and the control unit commands the contact element 135 to return to the first position in which the contact element is distal from the meat portion and the base 130 to translate, thanks to the action of the actuator W, in the initial position at the free end of the conveyor belt A. Concurrently, the control unit commands the actuator 80 to make the platform 75 rotate from the first to the second working position, as shown in FIG. 4, in which the platform 75 is placed in transverse position with respect to the horizontal plane to limit the oscillations for the meat portions 15 that are moved towards the magazine M2 by the movement apparatus 70. Once the sustaining elements 20A, 20B arrive at the magazine M2, the conveyor A3 of the magazine M2 extracts, from the movement apparatus 70, the sustaining elements 20A,20B that support the meat portions 15. Once the movement apparatus has moved the meat portions 15 from the hooking area, the control unit commands the actuator 80 to reposition the platform 75 in the first horizontal position.

The operation of the second embodiment of the loading station 10 of the plant I, shown in FIG. 6, provides for positioning the meat portion 15 on the conveyance surface of the conveyor A so that an edge of the meat portion 15 is at the free end of the conveyor belt A. At this point, the control unit commands the translation of the conveyor belt A, with respect to the support frame S, between the first position, in which the conveyor belt A is not superposed in plan view to the platform 75, and the second position, in which it is superposed in plan view to the platform 75. In this position the control unit commands the rearward motion of the conveyor belt A with respect to the support frame S from the second to the first position and concurrently it actuates the advance of the conveyance surface A1 of the conveyor belt A so as to transfer the meat portions 15 from the conveyor belt A to the platform 75. In this way an end of the meat portions 15 is made to rest on the needles 40 of the sustaining element 20A,20B.

In this position the longitudinal axis of the needles 40 is substantially orthogonal to the surface of the resting platform of the meat portions, i.e. the needles 40 are oriented upwards. The positioning of the needles is carried out by an actuator 42 that acts on the plate 50 causing the rotation of the bar 45 of the sustaining elements 20A,20B.

At this point the control unit commands the translation of the contact element 135 of the press 125 between the first and the second position in which the contact element 135 exerts a pressure on the meat portion 15 and presses it against the needles 40 so as to penetrate the meat portion with the needles 40.

At this point, the meat portion 15 is hooked to the needles 40 of the sustaining element 20 and the control unit commands the contact element 135 to return to the first position in which the contact element is distal from the meat portion 15 and the base 130 to return to the initial position at the free end of the conveyor belt A. Concurrently, the control unit commands the actuator 80 to make the platform 75 rotate from the first to the second working position, as shown in FIG. 4, in which the platform 75 is placed in transverse position with respect to the horizontal plane to limit the oscillations for the meat portions 15 that are moved towards the magazine M2 by the movement apparatus 70. Once the sustaining elements 20A,20B arrive at the magazine, the conveyor A3 of the magazine M2 extracts, from the movement apparatus 70, the sustaining elements 20A,20B that support the meat portions 15.

Once the movement apparatus has moved the meat portions 15 from the hooking area, the control unit commands the actuator 80 to reposition the platform 75 in the first horizontal position.

The operation of the unloading station 145, illustrated in FIGS. 7 to 12, is commanded and controlled by the electronic control unit that provides for actuating the movement apparatus 170 of the sustaining elements 20A,20B of the meat portions 15. When, during the actuation of the movement apparatus 170 the meat portions are at the abutment element 150 (FIG. 7), the control unit actuates the tilting device D so that the roller D1 causes the rotation of the meat portion 15, and of the related sustaining element 20A,20B with respect to the support element 85A,85B so that the free edge of the meat portion 15, or the edge opposite the one in which the needles 40 penetrate the meat portion 15, is above the conveyor belt 165, whose resting surface translates at a velocity controlled by the control unit. In this way during the movement of movement apparatus 170 the meat portion 15 is sustained horizontally on the conveyor belt 165 with the needles 40 that still penetrate the meat portion 15. At this point the control unit actuates, according to a first embodiment of the invention, the actuating mechanism 180 of the buffer 175 of the rotation limiter device of the sustaining element 20A, and hence of the needles 40. With this solution, during the subsequent movement of the movement apparatus 170, the needles 40 are extracted from the meat portions 40 without creating excessive laceration in the meat itself.

In a second embodiment of the unloading station 145, illustrated in FIGS. 10-12, in which the support element 85B is like in the second embodiment of the support element 85b and the sustaining element 20b is like in the second embodiment of the sustaining element 20B, the limiter device comprises the support element 85B and the sustaining element 20B, in particular the abutment bodies B of said sustaining elements. In this case, during the actuation of the movement apparatus 170 while the meat portions 15 are set on the conveyor belt 165, whose resting surface translates at a velocity controlled by the control unit, the limiter device is configured to allow a relative rotation of the sustaining element 20B with respect to the support element 85B between a first end stop position in which the needles 40 are arranged with the longitudinal axes horizontal, i.e. corresponding to the unperturbed position, and a second end stop position, in which the needles 40 are positioned with longitudinal axes perpendicular to an axis of lay of the abutment surface 155 and are oriented upwards. The subsequent movement of the movement apparatus 170 allows to extract the needles 40 extracted from the meat portions 40 without creating excessive laceration in the meat itself.

The invention thus conceived is susceptible to several modifications and variations, all falling within the scope of the inventive concept.

Moreover, all the details can be replaced by other technically equivalent elements.

Practically, any materials and also any contingent shapes and sizes may be used, depending on the needs, without departing from the scope of protection of the following claims.

The invention claimed is:

1. An automated loading station for meat portions configured so as to hook, at a hooking area, a meat portion to a sustaining element, said loading station comprising:
   a movement apparatus for moving the sustaining elements configured so as to move a sustaining element at the hooking area,
   a conveying apparatus for conveying the meat portions configured so as to convey the meat portion at the hooking area and to align a segment of the meat portion to a plurality of needles of the sustaining element, and
   a press configured so as to press the meat portion against the needles of the sustaining element positioned in the hooking area to penetrate the meat portion with said needles,
   wherein the movement apparatus comprises a support element to which a sustaining element is connected to move said sustaining element at the hooking area.

2. The loading station according to claim 1, wherein each needle is rectilinear.

3. The loading station according to claim 1, wherein each sustaining element comprises a bar to which are rigidly connected the needles of the plurality of needles.

4. The loading station according to claim 1, wherein the movement apparatus comprises a platform positioned in the hooking area and able to support inferiorly the sustaining element.

5. The loading station according to claim 1, wherein the support element and the sustaining element are configured so as to allow a relative rotation of the sustaining element with respect to the support element between a first end stop position and a second end stop position, which end stop positions are separated by a rotation between 80° and 100°.

6. The loading station according to claim 1, wherein the press comprises a base and a contact element able to contact the meat portions directly to penetrate the meat portion with said needles and movable along an axis.

7. The loading station according to claim 6, wherein the press comprises a plurality of contact elements independent of each other and flanking each other along a direction of flanking, perpendicular to a feed direction of the meat portions at the hooking area.

8. A processing plant for processing meat portions provided with a loading station and an unloading station,
   wherein the loading station is automated and is configured so as to hook, at a hooking area, a meat portion to a sustaining element, which loading station is provided with:
   a movement apparatus for moving the sustaining elements configured so as to move a sustaining element at the hooking area,
   a conveying apparatus for conveying the meat portions configured so as to convey the meat portion at the hooking area and to align a segment of the meat portion to a plurality of needles of the sustaining element, and
   a press configured so as to press the meat portion against the needles of the sustaining element positioned in the hooking area to penetrate the meat portion with said needles; and
   wherein the unloading station is configured so as to unhook a meat portion from a sustaining element and comprises:
   an abutment body defining an abutment surface able to sustain inferiorly the meat portion,
   a movement apparatus for moving the sustaining elements, configured to move a sustaining element at the abutment body between a first position, in which the sustaining element is at a higher elevation with respect to the abutment surface, and a second position, in which the sustaining element is at a lower elevation with respect to the abutment surface, so that in the passage from the first position to the second position the meat portion rests at least partially on the abutment surface and the needles are extracted from the meat portion.

9. The plant according to claim 8, wherein the movement apparatus for moving the unloading station comprises a support element to which the sustaining element is rotatably connected and the movement apparatus is configured to move the support element at the abutment body between a first position, in which the support element is at a higher elevation with respect to the abutment surface, and a second position, in which the support element is at a lower elevation with respect to the abutment surface, so that in the passage from the first position to the second position the meat portion rests at least partially on the abutment surface and the needles are extracted from the meat portion.

10. The plant according to claim 8, wherein the movement apparatus of the unloading station comprises a rotation limiter device, which is configured to prevent the relative rotation of the sustaining element with respect to the support element beyond an end stop position in which the needles are oriented upwards and with longitudinal axes perpendicular to an axis of lay of the abutment surface.

11. The plant according to claim 8, wherein the limiter device is configured to limit the relative rotation of the sustaining element with respect to the support element between a first end stop position in which the needles are arranged with the longitudinal axes horizontal and a second end stop position, in which the needles are arranged with the longitudinal axes perpendicular to an axis of lay of the abutment surface and are oriented upwards.

12. The plant according to claim 8, wherein the rotation limiter device comprises an abutment body with which the sustaining element is provided, and a first abutment body and a second abutment body, configured to cooperate with the abutment body, and with which the support element is provided.

13. The plant according to claim 8, wherein the movement apparatus comprises a guide configured to prevent a rotation of the support element with respect to the abutment body.

14. An automated loading station for meat portions configured so as to hook, at a hooking area, a meat portion to a sustaining element, which loading station is provided with:
   a movement apparatus for moving the sustaining elements configured so as to move a sustaining element at the hooking area,
   a conveying apparatus for conveying the meat portions configured so as to convey the meat portion at the hooking area and to align a segment of the meat portion to a plurality of needles of the sustaining element, and
   a press configured so as to press the meat portion against the needles of the sustaining element positioned in the hooking area to penetrate the meat portion with said needles,
   wherein the press comprises a base and a contact element able to contact the meat portions directly to penetrate the meat portion with said needles and movable along an axis and
   wherein the press comprises a plurality of contact elements independent of each other and flanking each other along a direction of flanking, perpendicular to a feed direction of the meat portions at the hooking area.

15. The loading station according to claim 14, wherein each needle is rectilinear.

16. The loading station according to claim 14, wherein each sustaining element comprises a bar to which are rigidly connected the needles of the plurality of needles.

17. The loading station according to claim 14, wherein the movement apparatus comprises a platform positioned in the hooking area and able to support inferiorly the sustaining element.

18. The loading station according to claim 14, wherein the movement apparatus comprises a support element to which a sustaining element is connected to move said sustaining element at the hooking area.

19. The loading station according to claim 18, wherein the support element and the sustaining element are configured so as to allow a relative rotation of the sustaining element with respect to the support element between a first end stop position and a second end stop position, which end stop positions are separated by a rotation between 80° and 100°.

\* \* \* \* \*